US012105871B2

(12) United States Patent
Fujiwara

(10) Patent No.: US 12,105,871 B2
(45) Date of Patent: Oct. 1, 2024

(54) ELECTRONIC APPARATUS, METHOD FOR CONTROLLING ELECTRONIC APPARATUS, AND STORAGE MEDIUM

(71) Applicant: CANON KABUSHIKI KAISHA, Tokyo (JP)

(72) Inventor: Shogo Fujiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 17/987,305

(22) Filed: Nov. 15, 2022

(65) Prior Publication Data

US 2023/0185370 A1 Jun. 15, 2023

(30) Foreign Application Priority Data

Dec. 13, 2021 (JP) ................. 2021-201772

(51) Int. Cl.
*G06F 3/01* (2006.01)
*H04N 23/611* (2023.01)
*H04N 23/667* (2023.01)

(52) U.S. Cl.
CPC ........... *G06F 3/013* (2013.01); *H04N 23/611* (2023.01); *H04N 23/667* (2023.01)

(58) Field of Classification Search
CPC .... G06F 3/013; H04N 23/611; H04N 23/667; H04N 23/633
See application file for complete search history.

(56) References Cited

U.S. PATENT DOCUMENTS

| | | | | |
|---|---|---|---|---|
| 2012/0194689 A1* | 8/2012 | Kodama | ................. | H04N 23/72 |
| | | | | 348/E5.045 |
| 2018/0081171 A1* | 3/2018 | Park | ..................... | G02B 27/017 |
| 2019/0122047 A1 | 4/2019 | Uemura | | |
| 2020/0258607 A1* | 8/2020 | Gross | ..................... | G16H 10/60 |

FOREIGN PATENT DOCUMENTS

| | | |
|---|---|---|
| JP | 2019-030491 A | 2/2019 |
| JP | 2019-079144 A | 5/2019 |

\* cited by examiner

*Primary Examiner* — Michael E Teitelbaum
(74) *Attorney, Agent, or Firm* — Venable LLP

(57) ABSTRACT

An electronic apparatus comprising at least one memory and at least one processor which function as: an eyeball information acquisition unit configured to acquire eyeball information of a user; an estimation unit configured to estimate a user state based on the eyeball information; an operation process information acquisition unit configured to acquire operation process information that allows to identify operation content of the user; and a storage unit configured to record, in a time series, at least one of the eyeball information and the user state in association with the operation process information.

17 Claims, 13 Drawing Sheets

MOVING IMAGE MODE,
HAND HELD (STILL), TIME t0

MOVING IMAGE MODE,
HAND HELD (STILL), TIME t0 + $\Delta t$

ELECTRONIC APPARATUS, METHOD FOR CONTROLLING ELECTRONIC APPARATUS, AND STORAGE MEDIUM

BACKGROUND OF THE INVENTION

Field of the Invention

The present disclosure relates to an electronic apparatus, and more particularly to recording and utilization of line-of-sight information of the user.

Description of the Related Art

It is known that in various operations the way of moving the line-of-sight during an operation is different between an expert and a beginner. By quantitatively recording a dynamic change of the eyes of an expert, including the line-of-sight information, in association with each operation process, it is expected that a beginner is assisted in improving their level of skill.

For example, Japanese Patent Application Publication No. 2019-30491 discloses means of estimating a motion performance of a subject from a dynamic change of the eyes of the subject. It is known that a width of a gaze range of a person and a motion performance or level of skill of a person are correlated. Gaze range here refers to a focusing range or attention range. The gaze range can be estimated based on a feature value of an eyeball motion, such as the occurrence frequency, amplitude, or the like of a microsaccade.

Further, Japanese Patent Application Publication No. 2019-79144 discloses means for recording a captured image corresponding to a field-of-view of an operator, in association with the image capturing time and the operation process.

However, in the case of the prior arts disclosed in the above mentioned patent documents, it is difficult to estimate the part of the operation target where the operator was directing their line-of-sight and was paying attention.

SUMMARY OF THE INVENTION

The present disclosure provides an electronic apparatus that allows recording an operation processing and eyeball information or a user state of the operator.

The first aspect of the disclosure is an electronic apparatus comprising at least one memory and at least one processor which function as: an eyeball information acquisition unit configured to acquire eyeball information of a user; an estimation unit configured to estimate a user state based on the eyeball information; an operation process information acquisition unit configured to acquire operation process information that allows to identify operation content of the user; and a storage unit configured to record, in a time series, at least one of the eyeball information and the user state in association with the operation process information.

The second aspect of the disclosure is a method for controlling an electronic apparatus, comprising: an eyeball information acquisition step of acquiring eyeball information of a user; an estimation step of estimating a user state based on the eyeball information; an operation process information acquisition step of acquiring operation process information that allows to identify operation content of the user; and a storage step of recording, in a time series, at least one of the eyeball information and the user state in association with the operation process information.

The third aspect of the disclosure is a non-transitory computer-readable storage medium storing a program that causes a computer to execute: an eyeball information acquisition step of acquiring eyeball information of a user; an estimation step of estimating a user state based on the eyeball information; an operation process information acquisition step of acquiring operation process information that allows to identify operation content of the user; and a storage step of recording, in a time series, at least one of the eyeball information and the user state in association with the operation process information.

Further features of the present invention will become apparent from the following description of exemplary embodiments with reference to the attached drawings.

DESCRIPTION OF THE EMBODIMENTS

An embodiment of the present disclosure will now be described with reference to the accompanying drawings. Here an example of applying the present embodiment to a digital camera (image capturing apparatus) will be described. The electronic apparatus to which the present disclosure is applicable, however, is not limited to a digital camera, but may be an arbitrary apparatus.

Figure 1A:
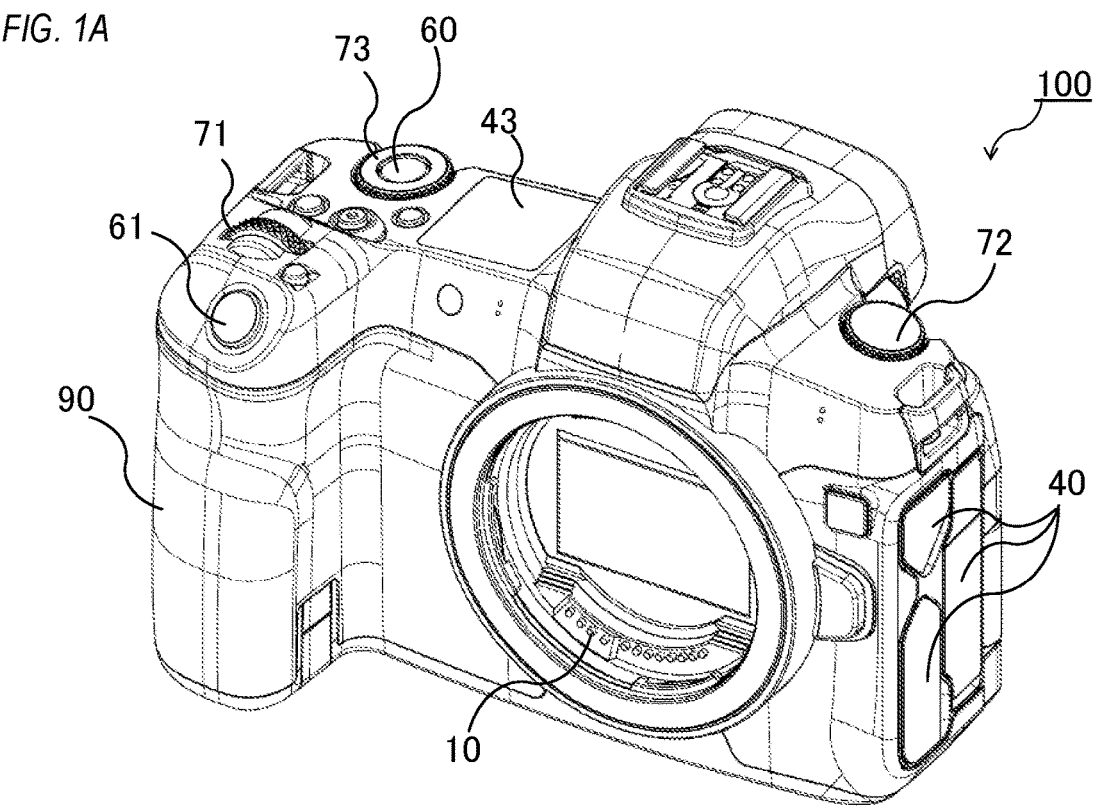
FIGS. 1A and 1B are external views of a digital camera 100 according to an embodiment.
Figure 1B:
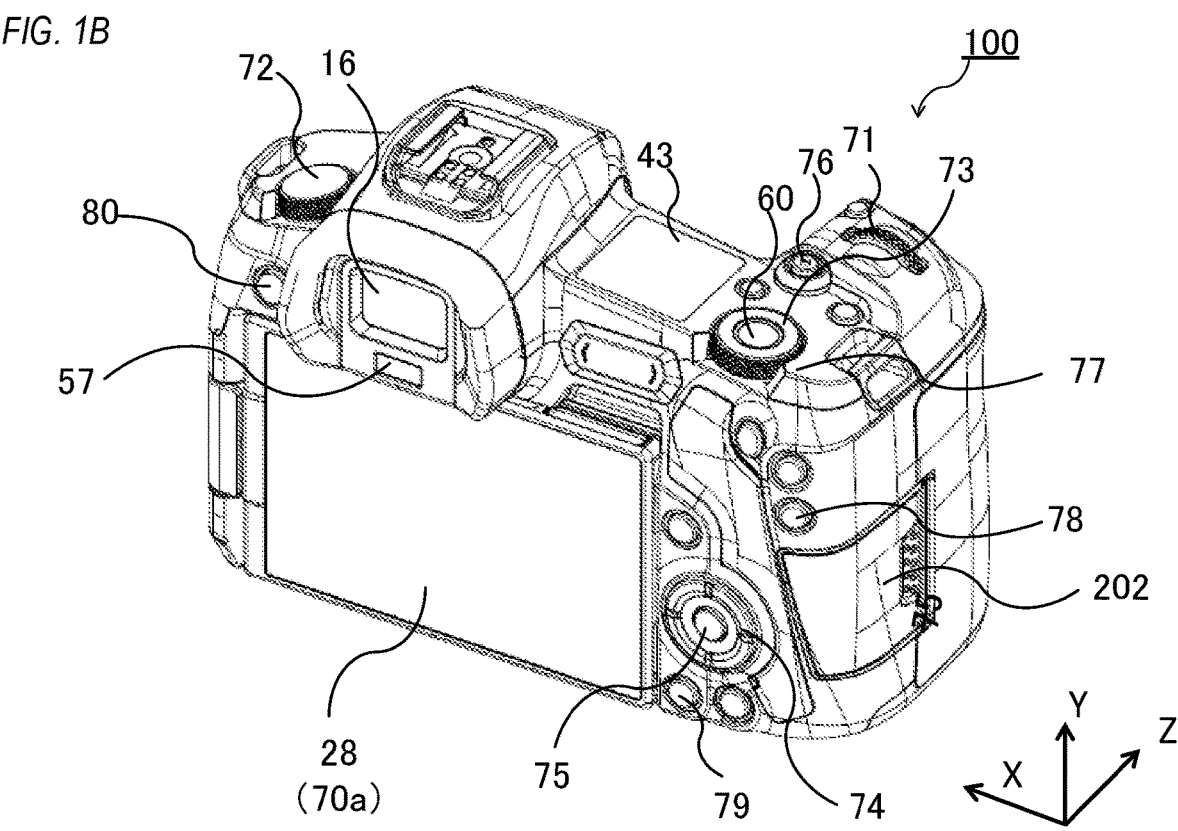

FIG. 1A is a front perspective view of a digital camera 100, and FIG. 1B is a rear perspective view of the digital camera 100.

In FIG. 1A and FIG. 1B, a display unit 28 is a display unit disposed on the rear face of the camera to display images and various information. A touch panel 70a can detect a touch operation performed on a display surface (operation surface) of the display unit 28. An outer finder display unit 43 is a display unit disposed on a top face of the camera to display various set values of the camera, such as the shutter speed and aperture.

A shutter button 61 is an operation unit to instruct to capture an image. A mode selection switch 60 is an operation unit to switch between various modes. A terminal cover 40 is a cover to protect a connector (not illustrated) to connect a connection cable, which is used to connect an external apparatus, and the digital camera 100. A main electronic dial 71 is a rotating operation member included in an operation unit 70, and the set values of the shutter speed, aperture and the like can be changed by turning this main electronic dial 71. A power switch 72 is an operation member to switch the power supply of the digital camera 100 ON/OFF. A sub-electronic dial 73 is a rotating operation member included in the operation unit 70, to move a selector frame, and switch images, for example. A cross key 74 is included in the operation unit 70, and is a cross key (four-direction key) of which the upper, lower, left and right portions can be pressed respectively. An operation corresponding to the pressed portion of the cross key 74 can be performed. A SET button 75 is included in the operation unit 70, and is a push button mainly used for determining a selected item. A moving image button 76 is used for instructing to start or stop moving image capturing (recording). An AE lock button 77 is included in the operation unit 70, and can fix the exposure state if pressed in the image capturing standby state. A magnifying button 78 is included in the operation unit 70, and is an operation button to turn the magnifying mode ON/OFF during live view display in the image capturing mode. By operating the main electronic dial 71 after the magnifying mode is turned ON, the live view image can be magnified or demagnified. In a reproduction mode, the magnifying button 78 functions as a magnifying button to magnify a reproduced images, and increase the magnification ratio. The reproduction button 79 is included in the operation unit 70, and is an operation button to switch between the image capturing mode and the reproduction mode. If the reproduction button 79 is pressed during the image capturing mode, the reproduction mode starts, where the latest image, out of the images recorded in the recording medium 200, can be displayed on the display unit 28. A menu button 80 is included in the operation unit 70, and if pressed, a menu screen, in which various settings can be performed, is displayed on the display unit 28. The user can intuitively perform various settings using the menu screen displayed on the display unit 28, the cross key 74 and the SET button 75. A communication terminal 10 is a communication terminal for the digital camera 100 to communicate with a later mentioned lens unit 150 (removable).

An eyepiece unit 16 is an eyepiece unit of an eyepiece finder (look-in type finder), and the user can view an image displayed on the internal EVF 29 through the eyepiece unit 16. An eye approach detection unit 57 is an eye approach detection sensor that detects whether the user approaches their eye to the eyepiece unit 16. A cover 202 is a cover of a slot storing the recording medium 200.

A grip unit 90 is a holding unit having a shape for the user to easily grip with their right hand when the digital camera 100 is held. In a state of holding the digital camera 100 with holding the grip unit 90 with their little finger, a ring finger and a middle finger of the right hand, the shutter button 61 and the main electronic dial 71 are disposed at positions that can be operated with the index finger of the right hand. Further, in the same state, the sub-electronic dial 73 is disposed at a position that can be operated with the thumb of the right hand.

Figure 2:
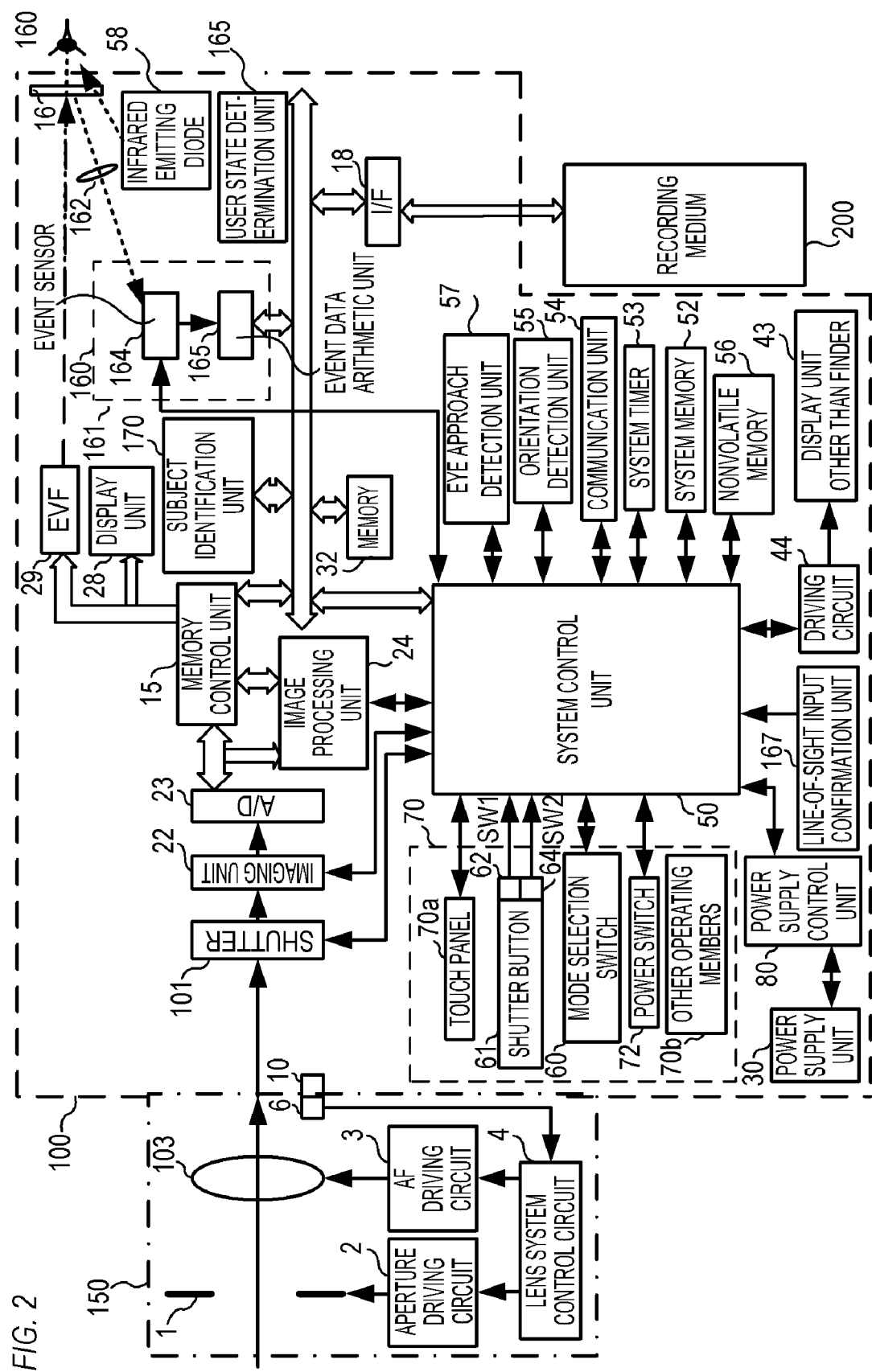
FIG. 2 is a schematic block diagram of the digital camera 100 according to an embodiment.

FIG. 2 is a block diagram depicting a hardware configuration example of the digital camera 100 according to the present embodiment.

In FIG. 2, the lens unit 150 is a lens unit including a replaceable image capturing lens. A lens 103 is normally constituted of a plurality of lenses, but is constituted of only one lens here for simplification. A communication terminal 6 is a communication terminal for the lens unit 150 to communicate with the digital camera 100. The lens unit 150 can communicate with the system control unit 50 via this communication terminal 6 and the above mentioned communication terminal 10. The lens unit 150 controls an aperture 1 via an aperture drive circuit 2 using an internal lens system control circuit 4, and performs focusing by moving a position of the lens 103 via an AF drive circuit 3.

A shutter 101 is a focal plane shutter which freely controls the exposure time of an imaging unit 22 by controlling the system control unit 50.

The imaging unit 22 is an image pickup element constituted of a CCD, CMOS element, or the like, that converts an optical image into electric signals. An A/D convertor 23 is used for converting an analog signal being outputted from the imaging unit 22 into a digital signal. Imaging by the imaging unit 22 synchronizes with a horizontal synchronization signal and a vertical line synchronization signal outputted by a timing generator unit (not illustrated), and outputs image data for one frame as frame data based on the cycle of the vertical synchronization signal. While an event sensor 163 is an asynchronous event base type sensor, the imaging unit 22 is a synchronous frame base type sensor. The imaging unit 22 is regarded as image acquisition means for acquiring image data, including a field-of-view of the user, and is also regarded as frame data acquisition means for acquiring frame data that is generated at a predetermined frame cycle.

An image processing unit 24 performs resize processing, such as a predetermined pixel interpolation and reduction, and color conversion processing on data from the A/D convertor 23 or data from a later mentioned memory control unit 15. The image processing unit 24 also performs predetermined arithmetic processing using the captured image data. The system control unit 50 performs exposure control and distance measurement control based on the arithmetic operation result acquired by the image processing unit 24. Thereby a through-the-lens (TTL) type auto focus (AF) processing, auto exposure (AE) processing and pre-flash emission (EF) processing are performed. The AF mode includes: a zone focusing (one shot AF) mode in which focus is fixed to a predetermined region; and a tracking (servo) AF mode, in which a predetermined subject is continuously focused, and the user can freely switch between these AF modes by operating the operation unit 70. These AF modes may also be automatically switched (AI focused AF).

The image processing unit 24 also performs predetermined arithmetic processing using the captured data, and performs TTL type auto white balance (AWB) processing based on the acquired arithmetic operation result. In the case of still image capturing, the image processing unit 24 encodes the image data by such a recording format as JPEG, so as to generate a still image file. In the case of moving image capturing, the image processing unit 24 multiplexes the video data encoded by H. 264/AVC or the like, and the audio data inputted from a microphone (not illustrated), and shapes the multiplexed data into a moving image format that is set as the recording format, so as to generate the moving image file.

A memory control unit 15 controls data transmission/reception among the A/D convertor 23, the image processing unit 24 and the memory 32. The output data from the A/D convertor 23 is written to the memory 32 via the image processing unit 24 and the memory control unit 15, or via the memory control unit 15 alone. The memory 32 stores image data acquired by the imaging unit 22 and converted into digital data by the A/D convertor 23, and image data to be displayed on the display unit 28 and the EVF 29. The memory 32 has a storage capacity that is sufficient for storing a predetermined number of still images and a predetermined duration of moving images and sound. The memory 32 corresponds to storage means.

The memory 32 also plays a role of a memory for displaying images (video memory). The image data for display, written in the memory 32, is displayed on the display unit 28 and the EVF 29 via the memory control unit 15. The display unit 28 and the EVF 29 perform display on such display units as an LCD and organic EL in accordance with the signals from the memory control unit 15. Live view display (LV display) can be performed if the data that was A/D-converted by the A/D convertor 23 and stored is the memory 32 is sequentially transferred to the display unit 28 or the EVF 29, and is displayed thereon. The image displayed in live view is called a "live view image (LV image)". The display unit 28 and the EVF 29 have a plurality of display modes corresponding to the operation modes of the camera. For example, an image capturing mode to perform LV display, a reproduction mode to reproduce captured images and moving images, and a menu mode in which various settings can be performed are provided, and the user can freely switch the display modes by operating the operation unit 70.

On the outer finder display unit 43, various set values of the camera, such as the shutter speed and aperture, are displayed via an outer finder display unit drive circuit 44.

A non-volatile memory 56 is an electrically erasable/recordable memory, for which a flash ROM or the like is used. In the non-volatile memory 56, constants, programs and the like for operation of the system control unit 50 are stored. "Programs" here refers to programs for executing various flow charts to be described later in the present embodiment.

The system control unit 50 is a control unit constituted of at least one processor or circuit, and controls the digital camera 100 in general. Each processing of the present embodiment, which will be described later, is implemented by executing programs recorded in the above mentioned non-volatile memory 56. A RAM, for example, is used for a system memory 52, where constants, variables, programs read from the non-volatile memory 56, and the like for operating the system control unit 50, are developed. The system control unit 50 also performs display control by controlling the memory 32, the display unit 28 and the like. Furthermore, the system control unit 50 can detect the operation mode of the camera and the state of the camera as the operation process information. The operation process information is information to identify the operation content that the user is performed. Examples of the operation mode are a still image capturing mode SW1, still image capturing mode SW2, moving image capturing mode, LV mode, MENU mode and sleep mode. Examples of the state of the camera are fixed on a tripod, hand held, capturing image while walking, capturing image while running, and panning. The system control unit 50 may be regarded as operation process information acquisition means for acquiring the operation process information.

The system timer 53 is a timer unit to measure time used for various controls and time of the internal block.

The mode selection switch 60, a first shutter switch 62, a second shutter switch 63 and an operation unit 70 are operation means for inputting various operation instructions to the system control unit 50. The mode selection switch 60 switches the operation mode of the system control unit 50 to the still image capturing mode, the moving image capturing mode, or the like. The still image capturing mode includes: an auto image capturing mode, an auto scene determining mode, a manual mode, an aperture priority mode (Av mode), a shutter speed priority mode (Tv mode), and a program AE mode (P mode). Various scene modes in which image capturing settings are performed depending on the image capturing scene, and a custom mode are also included. The user can directly switch to one of these modes using the mode selection switch 60. The user may select an image capturing mode list screen first using the mode selection switch 60, then select one of the plurality of modes displayed thereon, and switch to the selection mode using another operation member. In the same manner, the moving image capturing mode may include a plurality of modes. The mode selection switch 60 and the system control unit 50 correspond to operation mode setting means for setting the operation mode of the digital camera 100.

The first shutter switch 62 turns ON in the middle of operation of the shutter button 61 disposed in the digital camera 100, that is, in the half-depressed state (image capturing preparation instruction), and generates a first shutter switch signal SW1. By the first shutter switch signal SW1, the image capturing preparation operation is started, such as the auto focus (AF) processing, the auto exposure (AE) processing, the auto white balance (AWB) processing, and the pre-flash emission (EF) processing.

The second shutter switch 63 turns ON when operation of the shutter button 61 is completed, that is, in the fully depressed state (image capturing instruction), and generates a second shutter switch signal SW2. By the second shutter switch signal SW2, the system control unit 50 starts a series of the image capturing processing operations, from reading signals from the imaging unit 22 to writing the captured image in the recording medium 200 as an image file.

The operation unit 70, which includes various operation members, functions as an input unit to receive operation instructions from the user. The operation unit 70 includes at least the following operation units: the shutter button 61, a touch panel 70a, the main electronic dial 71, the power switch 72, the sub-electronic dial 73, the cross key 74, the SET button 75, the moving image button 76, the AE lock button 77, the magnifying button 78, the reproduction button 79 and the menu button 80.

The touch panel 70a and the display unit 28 may be integrated. For example, a touch panel 70a is configured such that the transmittance of light thereof does not interrupt display of the display unit 28, and is installed on the upper layer of the display surface of the display unit 28. Then the input coordinates on the touch panel 70a and display coordinates on the display screen of the display unit 28 are corresponded. Thereby a graphical user interface (GUI), as if the user were directly operating the screen displayed on the display unit 28, can be provided. The system control unit 50 can detect the following operations on the touch panel 70a or states thereof:

a finger or a pen which does not touch the touch panel 70a newly touches the touch panel 70a, that is, the start of touch (hereafter Touch-Down)

a finger or a pen is touching the touch panel 70a (hereafter Touch-On)

a finger or a pen is moving on the touch panel 70a in the touched state (hereafter Touch-Move)

a finger or a pen touching the touch panel 70a is released from the touch panel 70a, that is, the end of touch (hereafter Touch-Up)

nothing is touching the touch panel 70a (hereafter Touch-Off).

When Touch-Down is detected, Touch-On is detected at the same time. Unless Touch-Up is detected after Touch-Down, normally Touch-On is continuously detected. Touch-Move is also detected in the state where Touch-On is detected. Even if Touch-On is detected, Touch-Move is not detected unless the touch position is moving. When Touch-Up of the finger and the pen is detected and nothing is touching the touch panel 70a, Touch-Off is detected.

These operations/states and coordinates of the positions on the touch panel 70a, where a finger or a pen is touching, are notified to the system control unit 50 via the internal bus. Based on the notified information, the system control unit 50 determines which operation (touch operation) was performed on the touch panel 70a. For Touch-Move, the moving direction of the finger or the pen moving on the touch panel 70a can also be determined for the vertical component and the horizontal component on the touch panel 70a respectively, based on the change in the positional coordinates. In the case where Touch-Move for a predetermined distance or more is detected, it is determined that the slide operation was performed. An operation of quickly moving a finger for a certain distance while touching the touch panel and releasing the finger is called a "flick". In other words, flick is an operation of quickly moving (flicking) the finger on the touch panel 70a. In a case where Touch-Move for at least a predetermined distance at a predetermined speed or faster is detected and Touch-Up is detected immediately thereafter, it is determined that flick was performed (it is determined that flick occurred after the slide operation). Further, a touch operation of touching a plurality of locations (e.g. two points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply "pinch"). For the touch panel 70a, any one of the various types of touch panels may be used, such as a resistive film type, an electrostatic capacitive type, a surface acoustic wave type, an infrared type, an electromagnetic induction type, an image recognition type and a photosensor type. Some types detect touch when the touch panel is actually contacted, while other types detect touch when a finger or a pen approaches the touch panel, but either type can be used here.

A power control unit 31 is constituted of a battery detection circuit, a DC-DC convertor, a switch circuit to switch a block to be energized, and the like, and detects whether a battery is installed or not, a type of the battery, and a residual amount of the battery. The power control unit 31 also controls the DC-DC convertor based on this detection result and instructions from the system control unit 50, and supplies the required voltage to each portion, including the recording medium 200, for a required period of time. A power supply unit 30 is constituted of a primary battery (e.g. alkali battery, lithium battery), a secondary battery (e.g. NiCd battery, NiMH battery, Li battery), an AC adapter, and the like.

A recording medium I/F 17 is an interface with the recording medium 200, such as a memory card and a hard disk. The recording medium 200 is a recording medium to record captured images, such as a memory card, and is constituted of a semiconductor memory, magnetic disk, or the like.

A communication unit 54 is connected wirelessly or via cable, and transmits/receives video signals and audio signals. The communication unit 54 is also connectable to a wireless local area network (LAN) or Internet. The communication unit 54 is communicable with an external apparatus via Bluetooth® or Bluetooth Low Energy. The communication unit 54 can send an image (including LV image) captured by the imaging unit 22, and an image recorded in the recording medium 200, and can receive images or various other information from an external apparatus.

An orientation detection unit 55 detects an orientation of the digital camera 100 with respect to the gravity direction. Based on the orientation detected by the orientation detection unit 55, it can be determined whether the image captured by the imaging unit 22 is an image captured by the digital camera 100 held horizontally, or an image captured by the digital camera 100 held vertically. The system control unit 50 attaches the orientation information in accordance with the orientation detected by the orientation detection unit 55 to an image file of an image captured by the imaging unit 22, or records an image in the rotated state. For the orientation detection unit 55, an acceleration sensor, a gyro sensor, or the like, can be used. Using the acceleration sensor or the gyro sensor, the orientation detection unit 55 can detect a movement of the digital camera 100 (e.g. pan, tilt, lift up, remaining still). The orientation detection unit 55 may be regarded as movement information acquisition means for acquiring movement information of the digital camera 100.

An eye approach detection unit 57 is an eye approach detection sensor that detects the approach (contacting) and release (separating) of the eyeball (eye) 160 to the eyepiece unit 16 of the finder. Depending on the state detected by the eye approach detection unit 57, the system control unit 50 switches the display (display state)/non-display (non-display state) of the display unit 28 and the EVF 29. Specifically, in a case where the current state is at least the image capturing standby state and the switching of the display destination is automatic, the display destination is the display unit 28 (display thereof is ON), and EVF 29 in the non-display state while there is no eye approach. While there is an eye approach, on the other hand, the display destination is EVF 29 (display thereof is ON) and the display unit 28 is in the non-display state. For the eye approach detection unit 57, an infrared proximity sensor, for example, can be used, whereby the approach of any object to the eyepiece unit 16 of the finder enclosing the EVF 29 can be detected. When an object approaches, the infrared light emitted from an infrared light-emitting diode 58 is reflected by the object, and the reflected light is received by a light-receiving unit (not illustrated) of the infrared proximity sensor. Depending on the amount of received infrared light, the closeness of the object that approached the eyepiece unit 16 (eye approach distance) can also be determined. Thus the eye approach detection unit 57 performs eye approach detection to detect the approaching distance of the object to the eyepiece unit 16. It is determined that an eye approach occurred in the case where an object that approaches the eyepiece unit 16 within a predetermined distance is detected in the non-eye approach state (non-approaching state). And it is determined that an eye separation occurred in the case where an object of which approach was detected moved distant from the eyepiece unit 16 for at least a predetermined distance in the eye approach state (approaching state). A threshold to detect the eye approach and a threshold to detect the eye separation may be differentiated by setting a hysteresis, for example. Further, once an eye approach is detected, it is assumed that the eye approach state continues until an eye separation is detected. Once an eye separation is detected, it is assumed that the non-eye approach state continues until an eye approach is detected. The infrared proximity sensor here is one example, and other sensors may be used for the eye approach detection unit 57, as long as the sensor can detect the approach of an eye or object, and can regard the state as an eye approach.

A subject identification unit 170 analyzes the image data acquired by the imaging unit 22, and identifies the type of the image capturing subject, and specifies the size and position of the subject in the image data. For the subject identification unit 170, a convolution neural network, which is widely used for image recognition, may be used, for example.

An eyeball detection unit 161 is constituted of an eyeball detection lens 162, an event sensor 163, and an event data arithmetic unit 164, which will be described later, and can detect information on the eyeball (eye) 160 of the use looking into the finder (this information is hereafter called "eyeball information"). The eyeball detection unit 161 corresponds to eyeball information acquisition means for acquiring eyeball information of the user.

The event sensor 163 detects a brightness change (event) that is generated in the eyeball (eye) 160. An infrared light emitted from the infrared light-emitting diode 58 is reflected by the eyeball (eye) 160, and this infrared reflected light forms an image on the imaging surface of the event sensor 163 via the eyeball detection lens 162. The event sensor 163 is an event-based vision sensor which detects the brightness change of the light that enters each pixel, and outputs the information on a pixel where the brightness change occurred, asynchronously from the other pixels. The event sensor 163 corresponds to event data acquisition means. The data outputted from the event sensor 163 (hereafter event data) includes, for example, the positional coordinates of the pixel where the brightness change (event) occurred, the polarity (positive or negative) of the brightness change, and the timing information corresponding to the event generation time. Compared with the frame-based synchronous sensor, such as the case of the conventional imaging unit 22, the event sensor 163 is characterized in that the redundance of information to be outputted is eliminated, the operation speed is fast, the dynamic range is wide, and the power consumption is low. On the other hand, the event data is information from each pixel which is outputted asynchronously. Hence, in order to determine the correlation of event data, event data generated during a predetermined time must be stored and various arithmetic processing must be performed on the stored event data.

The event data arithmetic unit 164 is an arithmetic unit that detects the eyeball information (event information) based on the event data that is outputted continuously and asynchronously from the event sensor 163. For example, whether the eyeball information exists or not is determined by storing the event data that is generated during a predetermined time, and processing this event data in batch. By changing the storage time to store the event data, a plurality of eyeball information, of which generation speeds differ, can be detected.

The eyeball information includes eyeball movement information, which includes at least a part of: line-of-sight position information which is on the line-of-sight position of the user; saccade information, including the direction and speed of saccade; and microsaccade information, including the occurrence frequency and amplitude of the microsaccade. The eyeball information may include: pupil information including the size of the pupil or change amount thereof, and blinking information on the speed or number of times of blinking. These are merely examples of detectable eyeball information, and eyeball information is not limited thereto.

The event data arithmetic unit 164 may be configured such that event data stored during storage time is mapped as one frame of image data based on the event generation coordinates, and the image processing result is acquired. Thereby a plurality of eyeball information can be acquired from the event data using a method which has been performed in the conventional frame-based image data processing.

A user state determination unit 165 is a determination unit to determine a user state based on the eyeball information detected by the event data arithmetic unit 164. Examples of the user state are a gaze range, a degree of gaze (a degree of overlooking), a degree of concentration, a degree of fatigue and a degree of preference. The user state determination unit 165 corresponds to estimation means for estimating the user state.

The gaze range or the degree of gaze (degree of overlooking) can be determined based on the frequency and amplitude of the microsaccade. Here the gaze range is synonymous with an attention range or interest range, and indicates a range in which the user is paying attention to. The degree of gaze is an index that is higher as the gaze range narrows, and is lower as the gaze range widens. The degree of overlooking is the opposite of the degree of gaze.

The degree of concentration can be determined based on the frequency and amplitude of the microsaccade, the size or the change amount of the pupil, and the speed or number of times of blinking. The degree of concentration indicates a degree at which the user is concentrating. The degree of fatigue is the opposite of the degree of concentration.

The degree of preference is related to the speed of the microsaccade and the pupil diameter, and can be determined based on these parameters. The degree of preference indicates how much the user prefers the gaze target (e.g. the human face).

The user state determination unit 165 determines the above mentioned user states when the parameters on eyeball information (microsaccade, blinking, pupil), the identification result by the subject identification unit 170, and the like, are inputted. For this determination, machine learning-based classifiers (learning models), such as a neural network, can be used, for example. The classifiers can be constructed by machine learning using the learning data of eyeball information, classification result of the subject, and indexes indicating the state of the user (hereafter "user state information") such as the gaze range, degree of gaze (opposite of degree of overlooking), degree of concentration (opposite of degree of fatigue), and degree of preference. The configuration of the user state determination unit 165, however, is not limited to this, but may have other configurations, such as rule-based determination means, for example. The eyeball information and the determination result used by the user state determination unit 165 are not limited to the above, but different configurations may be used.

A line-of-sight input setting unit 166 sets whether the line-of-sight detection by the eyeball detection unit 161 is enabled or disabled via the system control unit 50. The line-of-sight input setting unit 166 can set the parameters and detection conditions related to the event data arithmetic unit 164 and the user state determination unit 165. The user can perform these settings freely using the menu settings.

The system control unit 50 can acquire information on the display size of the captured subject (object) and the display region thereof of the EVF 29. Further, information on the region of the EVF 29 at which the user is directing their line-of-sight can also be acquired using the eyeball detection unit 161. Thereby the system control unit 50 can determine which region of the subject the user is looking at.

Example 1

A digital camera 100 of Example 1 of the present disclosure will be described with reference to FIGS. 3A to 3C, FIG. 4 and FIG. 5. In Example 1, the digital camera 100 records subject information and eyeball information of the camera user, in association with the state information of the camera user (user state information) that is estimated based on the correlation between the subject information and the eyeball information. As mentioned above, the eyeball information is computed based on the event data stored during a predetermined period. In Example 1, the storage start time, when storage of the event data is started, is synchronized with the cycle of the frame data (image data). The storage time of the event data, from the storage start time to the storage end time, is the same as 1/(integer) or an integral multiple of a frame cycle of the frame data.

Figure 3A:
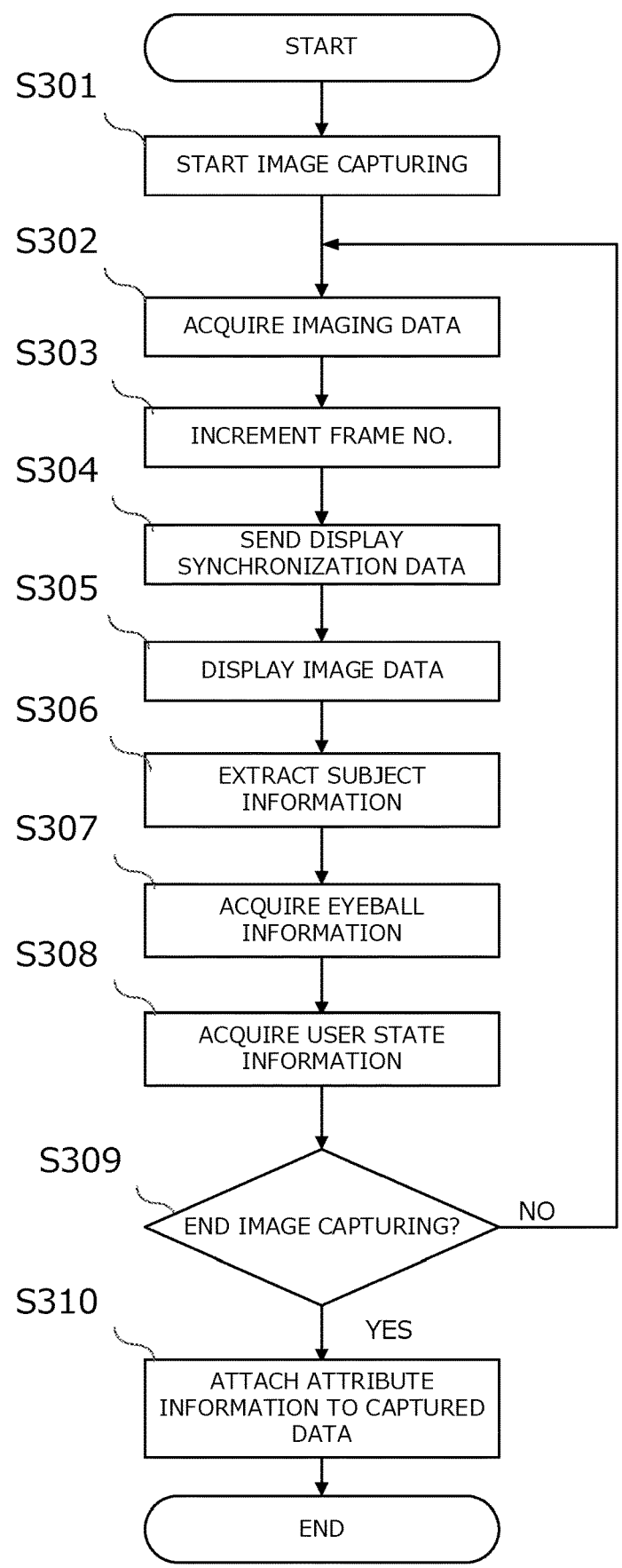
FIG. 3A is a flow chart explaining Example 1.
Figure 3B:
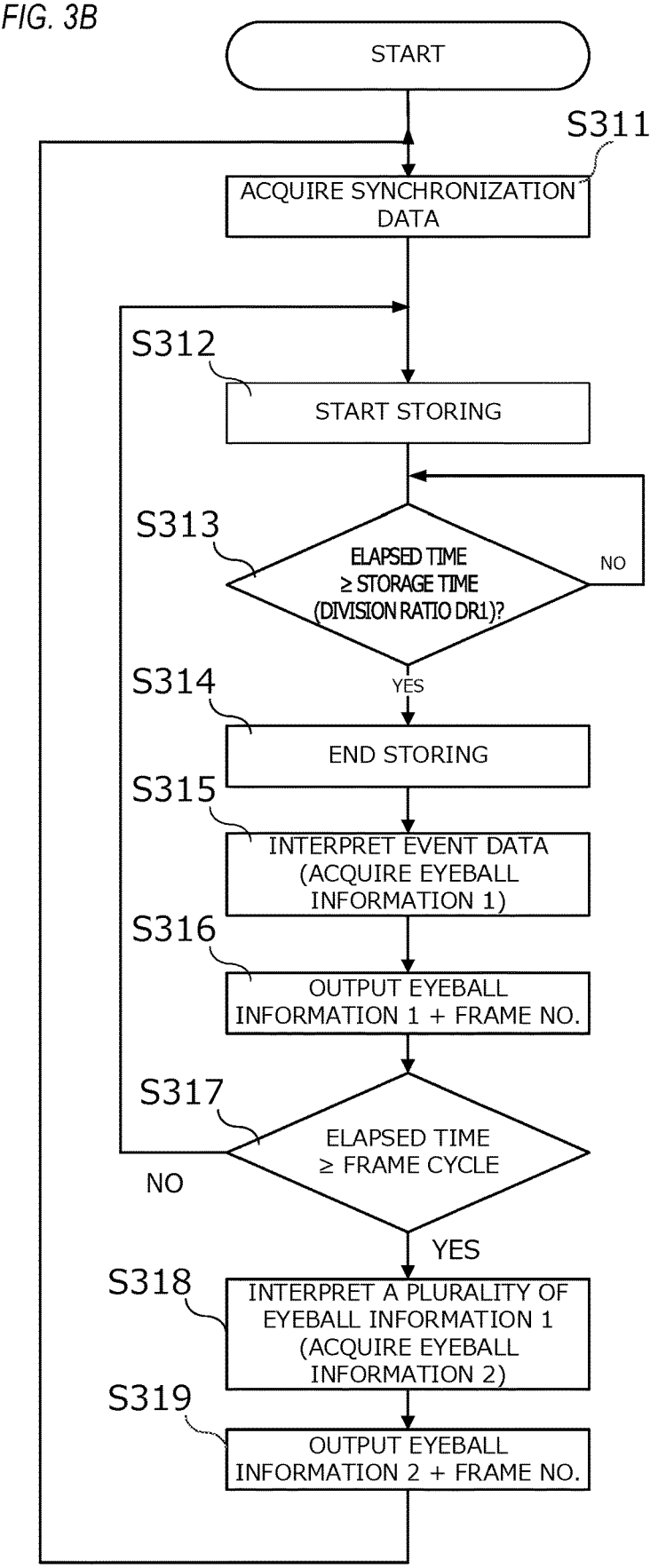
FIG. 3B is a flow chart explaining Example 1.
Figure 3C:
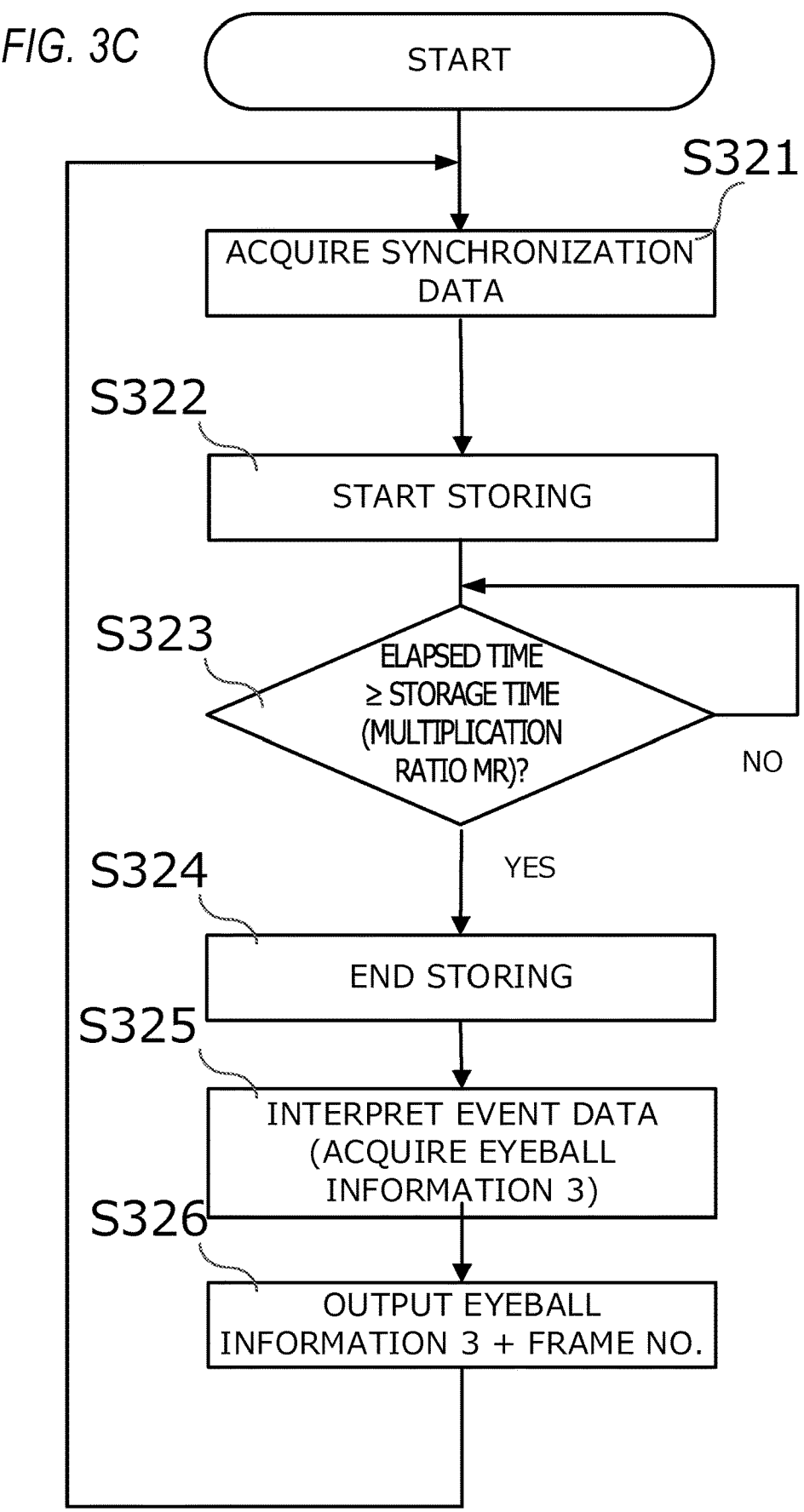
FIG. 3C is a flow chart explaining the first example.

FIGS. 3A to 3C are flow charts explaining Example 1. Each processing of the flow charts in FIGS. 3A to 3C is implemented by the system control unit 50 of the digital camera 100 developing programs, which are stored in the non-volatile memory 56, in the system memory 52, executing the programs and controlling each functional block. The general flow will be described first with reference to FIG. 3A.

In step S301, the system control unit 50 detects the user operation using the operation unit 70, and starts capturing the moving image.

In step S302, the system control unit 50 acquires one frame of image data using the imaging unit 22.

In step S303, the system control unit 50 increments the frame number of the image data.

In step S304, the system control unit 50 sends a display synchronization signal, which indicates the image data display timing, to the EVF 29 and the event data arithmetic unit 164. The display synchronization data signal is a data signal of which timing synchronizes with a vertical line synchronization signal, which is sent to the EVF 29, and which includes a frame number, for example.

In step S305, the system control unit 50 displays the image data, which was acquired in step S302, on the EVF 29.

In step S306, the system control unit 50 analyzes the frame data (image data) using the subject identification unit 170, and extracts subject information. The subject information includes the type, size information in the frame data, or the position information on the subject included in the frame data, for example. The system control unit 50 stores the subject information in the memory 32 in association with the frame number.

In step S307, the system control unit 50 computes the event data, which was acquired from the event sensor 163, using the event data arithmetic unit 164, and acquires eyeball information, such as the line-of-sight information, the saccade information, the microsaccade information, the pupil information and the blinking information. The system control unit 50 stores the acquired eyeball information in the memory 32, in association with the frame number when each information was acquired.

In step S308, the system control unit 50 inputs the subject information and the eyeball information to the user state determination unit 165, and acquires various user state information as the output result thereof. In this case, the information to be inputted to the user state determination unit 165 is the subject information and the eyeball information to which the same frame number is associated. The system control unit 50 stores the acquired user state information in the memory 32 in association with the frame number when the information was acquired.

In step S309, the system control unit 50 detects the user operation via the operation unit 70, and determines whether the moving image capturing is continued. Processing advances to step S310 if the moving image capturing ends. Processing return to step S302 if the moving image capturing continues.

In step S310, the system control unit 50 formats the image data to a moving image format to generate a moving image file, and records the moving image file after attaching the subject information, the eyeball information and the user state information as the attribute information.

The method for acquiring the eyeball information using the event sensor 163 will be described next with reference to FIG. 3B. FIG. 3B is a sub-routine to acquire the eyeball information that is performed in step S307 in FIG. 3A, and indicates an example when the storage cycle is a division of the moving image frame rate. "The storage cycle of the event data is a division of the moving image frame rate" means that the storage time of the even data is 1/(integer) is one frame period. Here the storage time of the event data is 1/DR (DR is an integer) of one frame time. The integer DR corresponds to the dividing ratio.

In step S311, the event data arithmetic unit 164 receives the display synchronization data signal which the system control unit 50 sent in step S304.

In step S312, the system control unit 50 starts storing the event data outputted from the event sensor 163 in the event data arithmetic unit 164.

In step S313, the system control unit 50 determines whether the elapsed time from the start of storing the event data (S312) reached a predetermined storage time (1 frame period/DR). Processing advances to step S314 if the determination result is YES, or storing of the event data is continued if the determination result is NO.

In step S314, the system control unit 50 ends the storing of the event data in the event data arithmetic unit 164.

In step S315, the system control unit 50 computes the event data using the event data arithmetic unit 164, and acquires the first eyeball information. The event data arithmetic unit 164 performs an arithmetic operation on the event data stored in a period from step S312 to step S314, and acquires the first eyeball information.

In step S316, the system control unit 50 associates the first eyeball information with the frame number included in the display synchronization data signal, and stores this information in the memory 32.

In step S317, the system control unit 50 determines whether the product of the elapsed time from the synchronization data acquisition (S311) and the dividing ratio DR reached the frame cycle. Processing advances if the determination result is YES, or returns to step S312 and storing data is started again if the determination result is NO.

In step S318, the system control unit 50 interprets the result of the acquired first eyeball information for a number of times of the dividing ratio DR, and newly acquires the second eyeball information.

In step S319, the system control unit 50 associates the second eyeball information with the frame number included in the display synchronization data signal, and stores this information in the memory 32.

Here the first eyeball information is the occurrence/non-occurrence of microsaccade and amplitude of the microsaccade, and is a parameter to be one of the indexes of the gaze range, for example. By setting a relatively short storage time, a rapid eyeball movement, including a microsaccade, can be identified. If the dividing ratio DR is 3, the information on the occurrence/non-occurrence and amplitude of microsaccade can be acquired three times in one frame period. The second eyeball information is the occurrence frequency of microsaccade, for example, and is a parameter to be one of the indexes of the degree of concentration, for example.

A method for acquiring the eyeball information using the event sensor 163 will be described next with reference to FIG. 3C. FIG. 3C is a sub-routine to acquire the eyeball information that is performed in step S307 in FIG. 3A, and indicates an example when the storage cycle is a multiple of the moving image frame rate. "The storage cycle of the event data is a multiple of the moving image time rate" means that the storage time of the event data is an integral multiple of one frame period. Here the storage time of the event data is MR times (MR is an integer) of one frame period. The integer MR corresponds to the multiplication ratio.

Steps S321 and S322 are the same as steps S311 and S312, hence description thereof is omitted.

In step S323, the system control unit 50 determines whether the elapsed time from the start of storing the event data (S322) reached a predetermined storage time (1 frame period×MR). Processing advances to step S324 if the determination result is YES, or storing of the data is continued if the determination result is NO.

Steps S324 to S326 are the same as steps S314 to S316, hence description thereof is omitted. The eyeball information acquired in step S325 is called the "third eyeball information".

Here the eyeball information 3 is a relative positional deviation amount between the eyeball (eye) 160 and the eyeball detection unit 161. By setting a relatively long storage time, rare eyeball information, such as the occurrence of a positional deviation of an eyelid or caruncle during the storage time, can be detected. The detected positional deviation amount can be used for proofing the line-of-sight position detection result, or can be used as one of the indexes of the degree of concentration.

FIGS. 3B and 3C are examples, and a configuration of setting a sub-routine for each eyeball information to be detected may be used. For example, the acquisition of the eyeball information using the first division ratio (e.g. 1/3) and the acquisition of the eyeball information using a second division ratio (e.g. 1/2) may be performed in parallel. In the same manner, the acquisition of the eyeball information using a first multiplication ratio (e.g. 2 times) and the acquisition of the eyeball information using a second multiplication ratio (e.g. 3 times) may be performed in parallel. On the other hand, if different eyeball information can be detected in the same storage time, a common sub-routine may be used.

Figure 4:
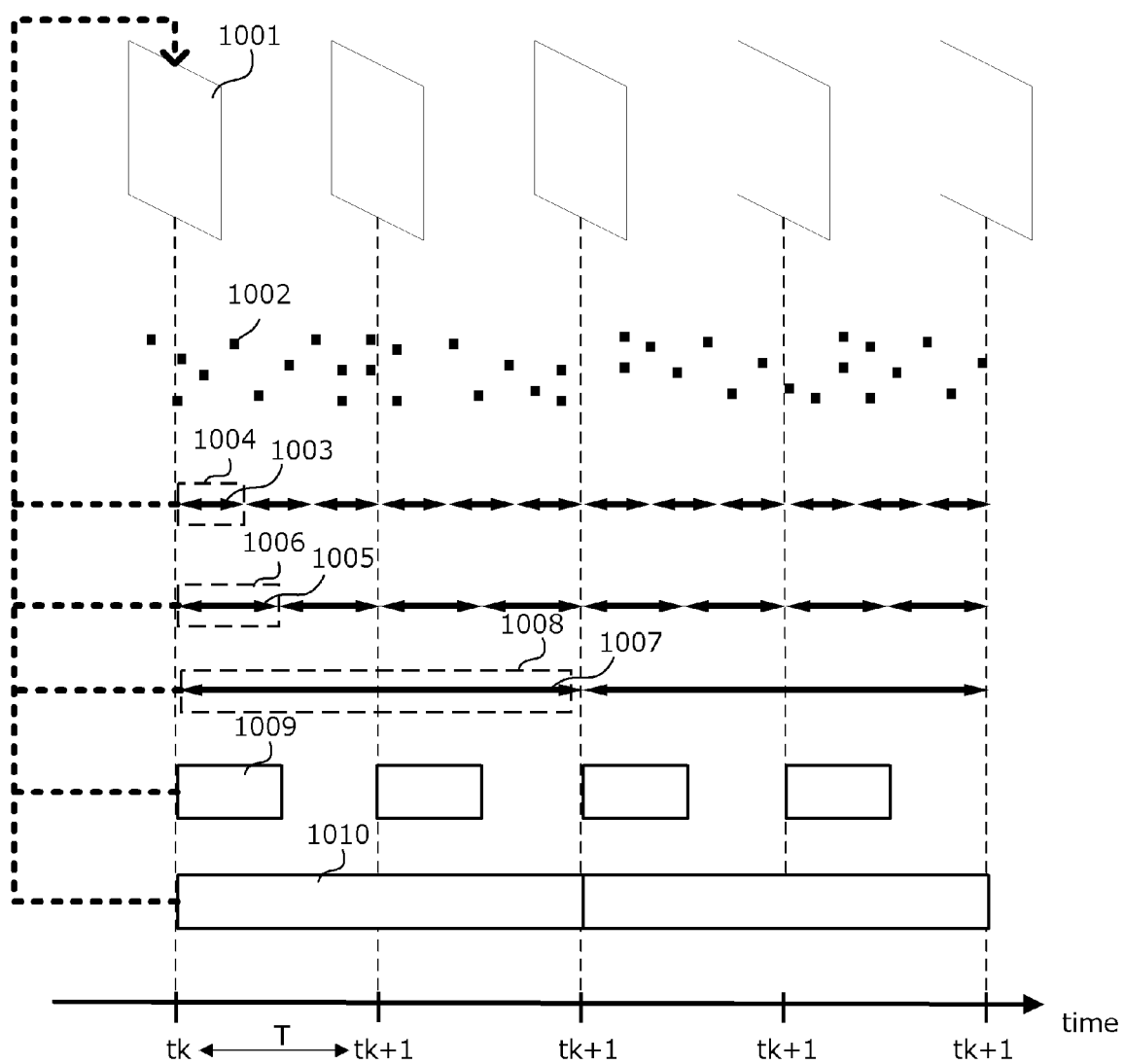
FIG. 4 is a time chart depicting a concept of an information association method according to Example 1.

FIG. 4 is a time chart that indicates a concept of a method of associating information according to Example 1 of the present disclosure. Image data 1001 indicates captured image data, which was captured at a predetermined frame rate by the imaging unit 22, and is displayed on the EVF 29. Event data 1002 indicates event data acquired by the event sensor 163. Here the event data that is generated from time $t_k$ to $t_{k+1}$ in FIG. 4 is related to the change of the eyeball movement of the camera user, caused by the result of viewing the image data 1001 displayed on the EVF 29 at time $t_k$.

Storage time 1003 indicates the time from the start of storing by the event data arithmetic unit 164 to the end of the storing. Storing is started when the display synchronization data signal is received in step S304, and the storing ends when the predetermined division ratio DR is reached. For example, the storage time 1003 is the display frame rate (T=$t_{k+1}$−$t_k$) divided by 3, and the storage start time is synchronized with the time $t_k$. The event data arithmetic unit 164 interprets the event data stored during the storage time 1003, and outputs the eyeball information 1004.

Storage time 1005 is the display frame rate divided by 2, for example. The event data arithmetic unit 164 interprets the event data stored during the storage time 1005, and outputs the eyeball information 1006.

Storage time 1007, on the other hand, is two times of the display frame rate. The event data arithmetic unit 164 interprets the event data stored during the storage time 1007, and outputs the eyeball information 1008.

For example, user state information 1009 is user state information that is outputted as a result of inputting the eyeball information 1004 and the eyeball information 1006. The user state information 1010 may be user state information that is outputted as a result of inputting the subject information, acquired from the image data 1001, and the eyeball information 1008.

In the above configuration, the storage time is determined based on a division ratio with respect to the display frame rate. By determining the storage time based on a division ratio, the image data display time and the event data storage start time are synchronized in the next image data display time $t_{k+1}$. If the storage time is determined based on a multiplication ratio, the image data display time and the event data storage start time are synchronized at the image data display time after the step corresponding to the multiplication ratio. Since the synchronized eyeball information is inputted and the user state information is acquired thereby, the user state information (e.g. degree of gaze) also becomes information synchronizing with the image data display time, just like the eyeball information. Because of this configuration, the user state information (e.g. degree of preference of subject) based on the correlation between the subject information and the eyeball information can be easily acquired.

In the examples in FIGS. 3A to 3C and FIG. 4, the storage time is a predetermined fixed value, but a predetermined number of event data may be set as a threshold, so that the event data is stored until the number of event data exceeds the threshold. A variable storage time is useful to acquire eyeball information of which generation timing is unknown (e.g. occurrence/non-occurrence of blinking). In this case, even if a variable storage time is used, the storage time is based on a division ratio or a multiplication ratio of the display frame rate. In other words, the storage of the event data is ended when the number of event data acquired after the storage start time exceeds the predetermined threshold, and the elapsed time matches with 1/(integer) of the frame cycle or an integral multiple thereof. Thereby the image data display time and the event data storage start time can be easily synchronized.

Figure 5:
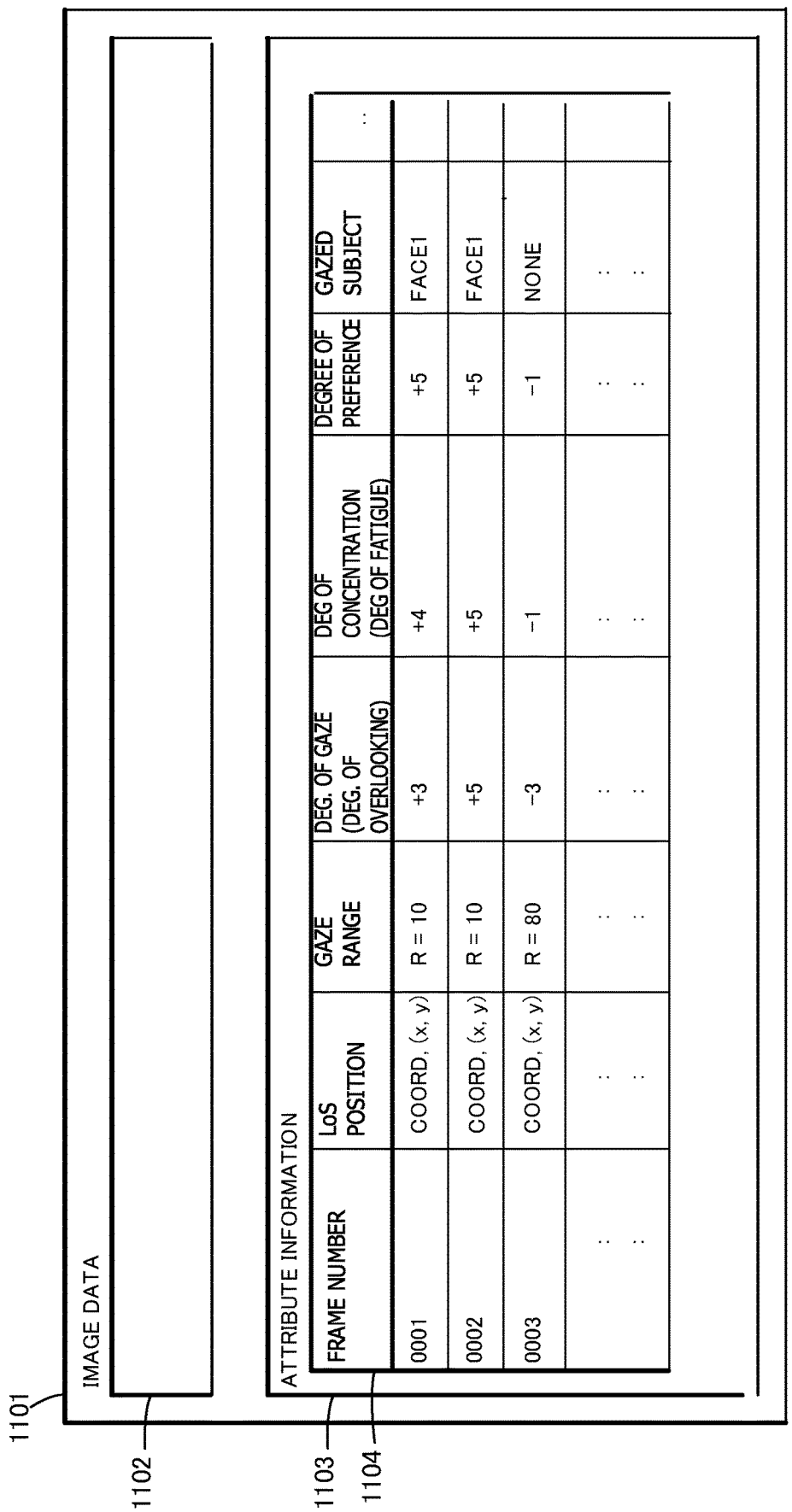
FIG. 5 is an example of a file structure of a moving image data according to Example 1.

FIG. 5 is an example of the file structure of moving image data to which attribute information has been attached by the processing in FIGS. 3A to 3C. A file 1101 indicates an entire moving image file recorded by the digital camera 100. Data 1102 indicates the moving image data captured by the digital camera 100. Data 1103 indicates the attribute information attached to the event data 1002. Data 1104 indicates the attribute information recorded in the processing in FIGS. 3A to 3C. The attribute information is meta data of subject information, eyeball information, and user state information, for example, and each information is associated with a frame number included in the display synchronization data signal.

The attribute information indicated in FIG. 5 is an example, and the present invention is not limited thereto. Such quantitative information as the microsaccade amplitude value may be used as the attribute information.

In the configuration of Example 1, each information is associated with the frame number included in the display synchronization data signal, but the display synchronization data signal may include display synchronization time information. In this case, 1104 has a configuration where each information is associated with the display time information.

In the configuration of Example 1, the attribute information is attached to the moving image data, but needless to say, the attribute information may be attached to the still image data.

Further, in the configuration of Example 1, the camera user views the image data displayed on the EVF 29, but the present disclosure is not limited to this configuration. For example, the present disclosure is also applicable to a single lens reflex camera using an optical view finder, or to a see-through type head mounted display in which the imaging means is included. In the case of this configuration, the storage start time of the event data synchronizes with the image capturing frame rate.

Example 1 is an example of applying the present disclosure to the digital camera 100, but the present disclosure is applicable to various electronic apparatuses as long as the apparatus has a configuration to store information associating the frame-based data and the event-based data with each other. For example, the imaging unit 22 is not an essential composing element, and the step S301 may be the start of reproduction of moving image data. That is, the reproduction display to reproduce and display the moving image data stored in the recording medium 200 on the EVF 29 is started. Step S302 is the acquisition of the moving image data. Steps S303 to S308 are the same as FIG. 3A. In step S309, it is determined whether the reproduction display is ended. Processing advances to step S310 if the reproduction display is ended (YES). In step S310, the attribute information is attached to the display data. Using this configuration, the present disclosure can also be applied to such a display apparatus as a head mounted display.

Example 2

A digital camera 100 of Example 2 of the present disclosure will be described with reference to FIGS. 6A to 6F and FIG. 7. In Example 2, the digital camera 100 records the captured moving image, with associating the user state related to the line-of-sight and the operation process information.

FIGS. 6A to 6F are explanatory diagrams in a time series, depicting the relationship between: an image which was captured by the digital camera 100 and is displayed on the EVF 29; a user state related to the line-of-sight; and operation process information. In the diagrams, common portions are denoted with a common number, with suffixes a to f which correspond to a drawing number, and redundant description on a common portion is omitted.

Figure 6A:
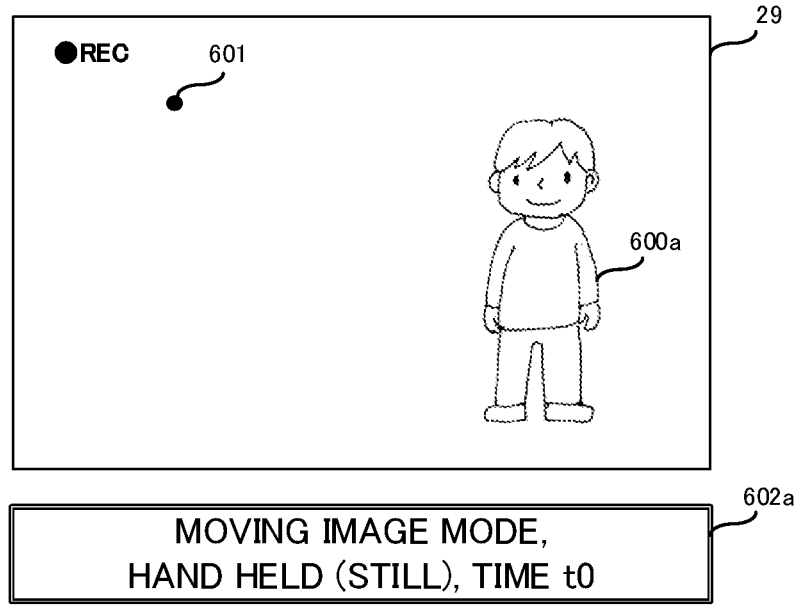
FIG. 6A is an explanatory diagram on information associated with a captured image according to Example 2.

FIG. 6A indicates a display image on the EVF 29 which the user is looking into and information attached thereto, at time t0 when the moving image capturing started. A subject 600a is captured by the imaging unit 22, and displayed on the EVF 29 at a size and position specified in the image data. A point 601 indicates the line-of-sight position of the user at time t0. Information 602 indicates an example of operation process information that is recorded in association with the user state. In Example 2, the image capturing mode, the camera state and the elapsed time from start of line-of-sight detection are indicated as the operation process information.

Figure 6B:
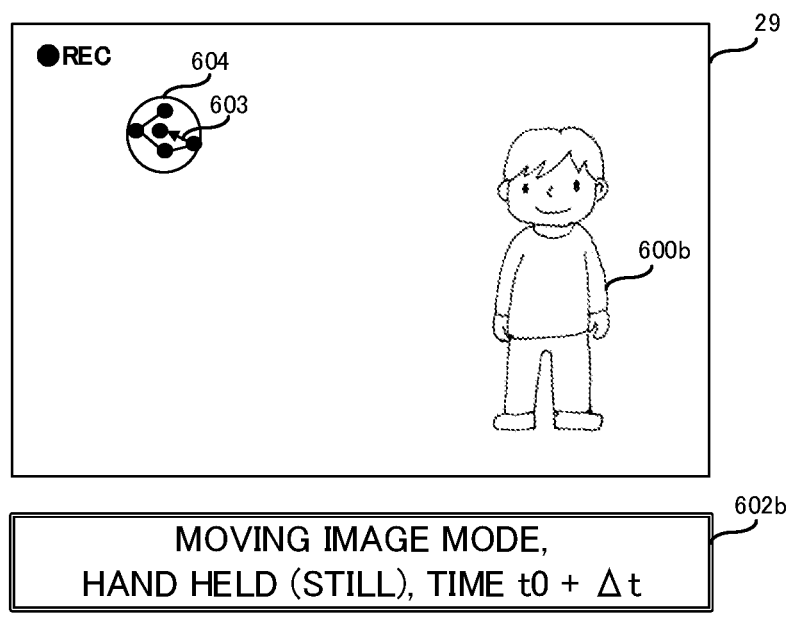
FIG. 6B is an explanatory diagram on information associated with a captured image according to Example 2.

FIG. 6B is a diagram where a predetermined time $\Delta t$ has elapsed from the time t0 (FIG. 6A). An arrow 603 indicates a track of the microsaccade amplitude (movement of the line-of-sight position) of the user during the predetermined time $\Delta t$. A region 604 is a circular region that includes the arrow 603, and is defined as a gaze range. In the example in FIG. 6B, the user who is standing still is capturing images in the moving image mode with holding the digital camera 100 with their hand, and the user is gazing at the upper left in the angle of view of the EVF 29. For the predetermined time $\Delta t$, an arbitrary time can be set, and a time shorter than the time between display frames on the EVF 29 may be set.

Figure 6C:
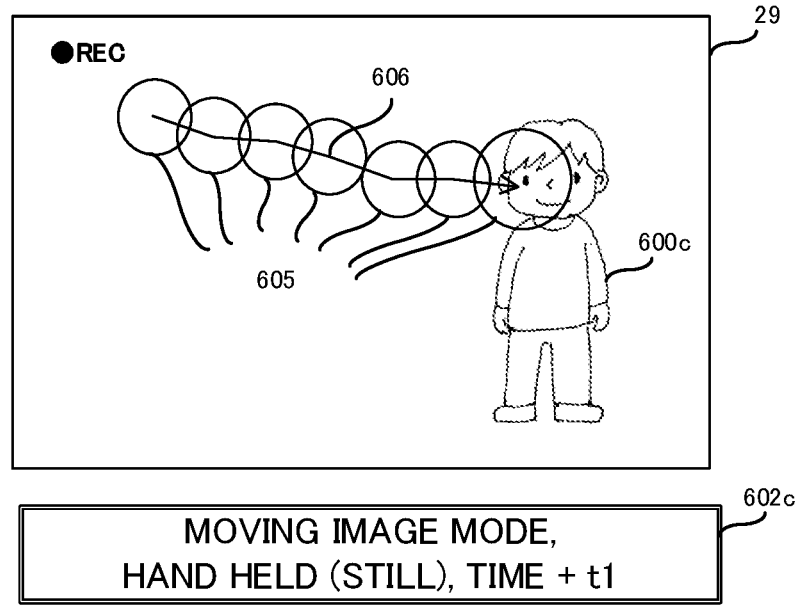
FIG. 6C is an explanatory diagram on information associated with a captured image according to Example 2.

FIG. 6C is a diagram at time t1 when the predetermined time $\Delta t$ or more has elapsed since the time t0 (FIG. 6A). A region group 605 indicates the gaze ranges at each time when the predetermined time $\Delta t$ has elapsed. An arrow 606 is a line connecting the center of each circular region included in the region group 605, and is defined as a line-of-sight moving direction of the user. In the example of FIG. 6C, the user is moving their line-of-sight from the upper left in the angle-of-view of the EVF 29 to the face of the subject 600c.

Figure 6D:
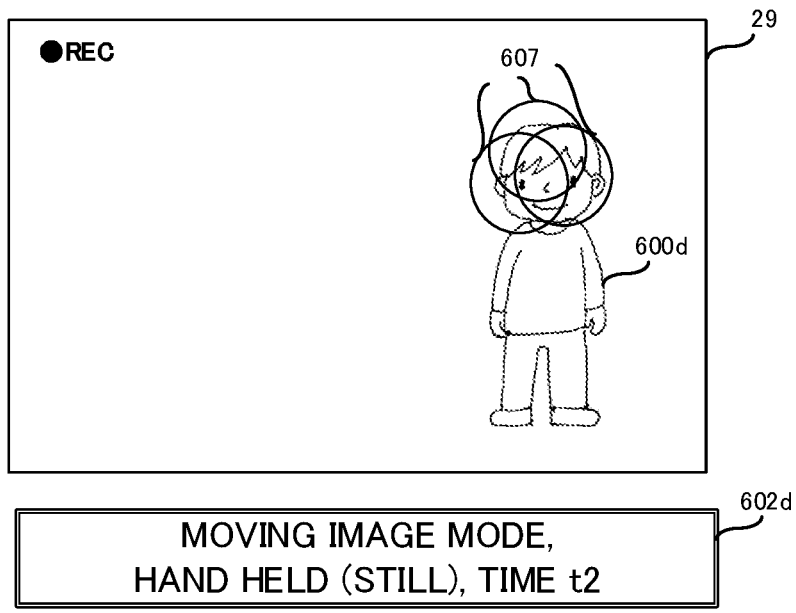
FIG. 6D is an explanatory diagram on information associated with a captured image according to Example 2.

FIG. 6D is a diagram at time t2 when a predetermined time has elapsed from the time t1 (FIG. 6C). A region group 607 indicates the gaze ranges from time t1 to time t2. In the example in FIG. 6D, the user is capturing images in the state of gazing at the entire face of the subject 600d.

Figure 6E:
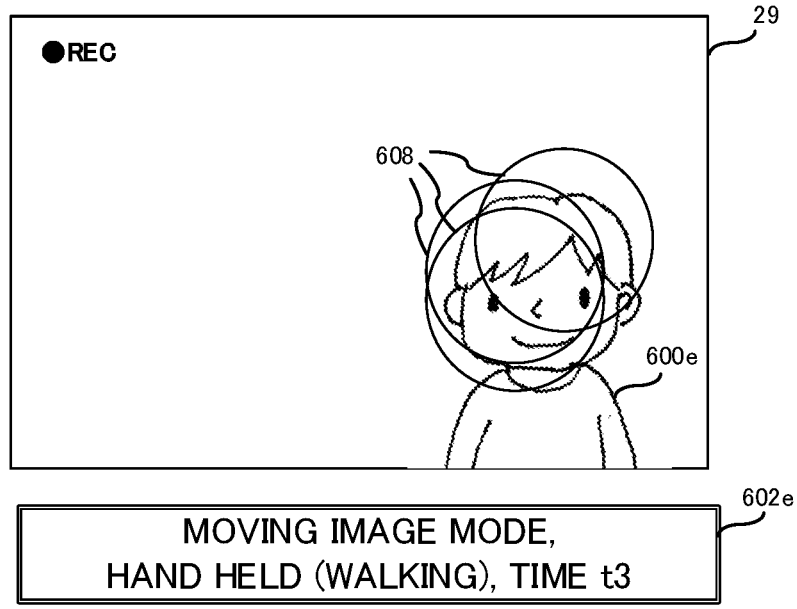
FIG. 6E is an explanatory diagram on information associated with a captured image according to Example 2.

FIG. 6E is a diagram at time t3 when a predetermined time has elapsed from the time t2 (FIG. 6D). A region group 608 indicates the gaze ranges from time t2 to time t3. Further, the operation processing information 602e indicates that the user shifted from the hand held (still) image capturing to the hand held (walking) image capturing. In the example in FIG. 6E, the user is capturing images in the state of gazing at the entire face of the subject 600e while walking toward the subject 600e.

Figure 6F:
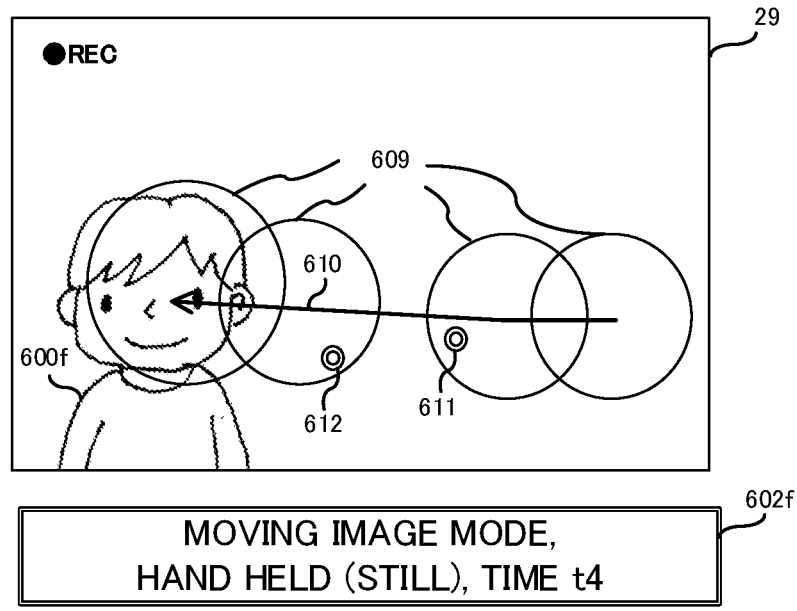
FIG. 6F is an explanatory diagram on information associated with a captured image according to Example 2.

FIG. 6F is a diagram at time t4 when a predetermined time has elapsed from the time t3 (FIG. 6E). A region group 609 indicates the gaze ranges from time t3 to time t4. An arrow 610 is a line connecting the center of each circular region included in the region group 609, and indicates that the line-of-sight of the user moved from the right to left on the EVF 29. Further, the operation process information 602f indicates that the user shifted from the hand held (walking) image capturing to the hand held (still) image capturing. A double circle 611 and a double circle 612 indicate that the line-of-sight detection was undetected for at least a predetermined time, and was then detected again. The double circle 611 indicates a line-of-sight position immediately before detection became impossible, and the double circle 612 indicates the line-of-sight position immediately after detection became possible again. The period from the double circle 611 to the double circle 612 can be defined as a period where the user was blinking. The example of FIG. 6F indicates that the subject 600f and the gaze range of the user shifted from the right to left on the EVF 29. Further, the example indicates that the user blinked once while their line-of-sight shifted from right to left on the EVF 29.

Figure 7:
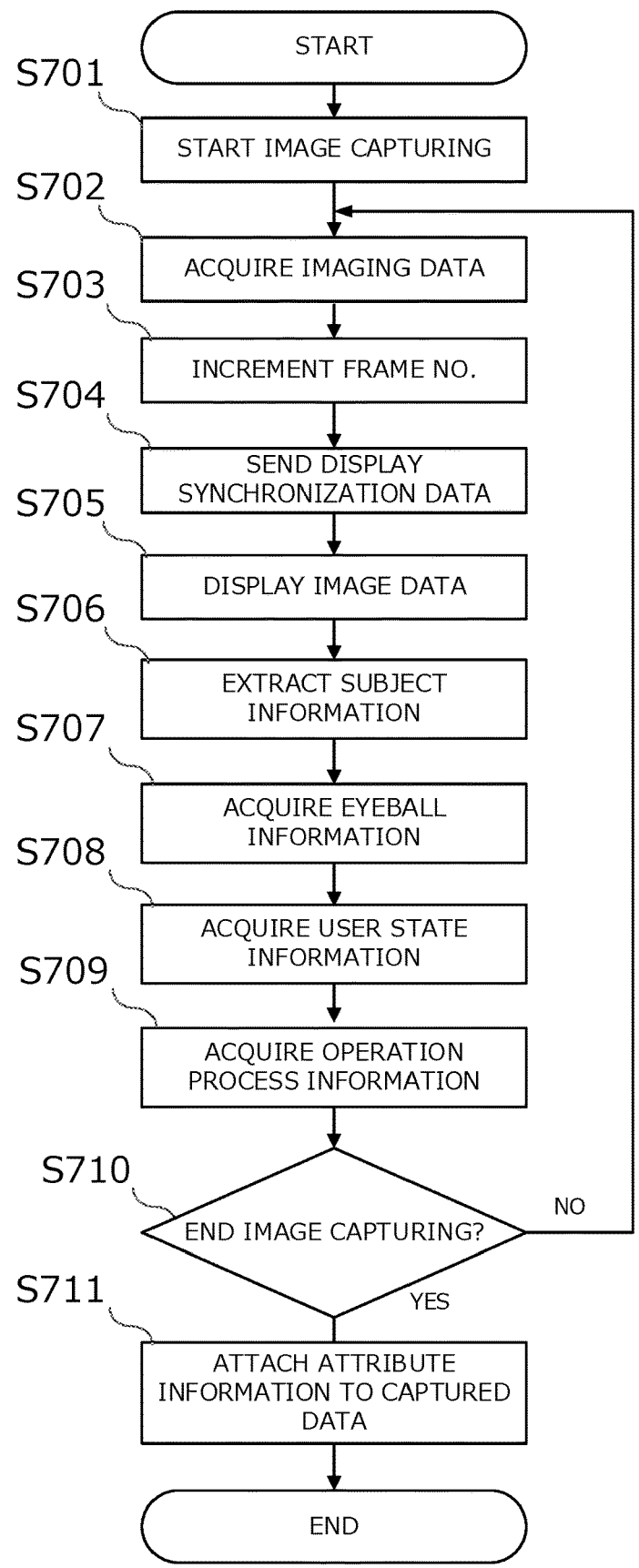
FIG. 7 is a flow chart explaining Example 2.

FIG. 7 is a flow chart for recording the image displayed on the EVF 29 of the digital camera 100 in association with the user state and the operation process information. This flow starts when the eyepiece unit 16 detects the approach of the eyeball (eye) 160 of the user.

Steps S701 to S706 are the same as steps S301 to S307 in FIG. 3A, hence description thereof is omitted.

In step S708, the system control unit 50 inputs the subject information and the eyeball information to the user state determination unit 165, and acquires various user state information as an output result. The information to be inputted to the user state determination unit 165 here is the subject information and the eyeball information which are associated with a same frame number. The system control unit 50 stores the acquired user state information in the memory 32, in association with the frame number used when acquiring the information. An example of the user state information is the gaze range, which can be calculated using the microsaccade information acquired in step S708. The gaze range may be defined as a circular region, including the track of the microsaccade amplitude (movement of the line-of-sight position) at a predetermined time Δt, for example, but the calculation method is not limited thereto.

In step S709, as the operation process information of the user, the system control unit 50 acquires the image capturing mode and the state of the digital camera 100 which is acquired from the orientation detection unit 55. Examples of the image capturing mode are: the moving image capturing mode; the still image capturing mode; and the still image capturing preparation mode. Examples of the state of the digital camera 100 are: the tripod image capturing state; the hand held image capturing state; the walking image capturing state (image capturing while walking); the running image capturing state (image capturing while running); and the panning image capturing state. The system control unit 50 can discern these states based on the outputs of the gyro sensor and the acceleration sensor included in the orientation detection unit 55. The system control unit 50 records the acquired operation process information to the memory 32, in association with the frame number that was used when each information was acquired.

Steps S710 and S711 are the same as steps S309 and S310 in FIG. 3 respectively, hence description thereof is omitted.

The above description on FIGS. 6A to 6F and FIG. 7 is an example, and the image capturing intention of the user can be recorded in more detail by recording the user state related to the line-of-sight and the operation process information in association with each other in a time series. In the case where the user is an expert, this recorded information can assist beginners to understand an expert's image capturing intensions more closely, and improve their skill.

Example 3

A digital camera 100 of Example 3 of the present disclosure will be described with reference to FIGS. 8 and 9. In Example 3, the digital camera 100 records the captured still image with associating the user state related to the line-of-sight and the operation process information.

Figure 8:
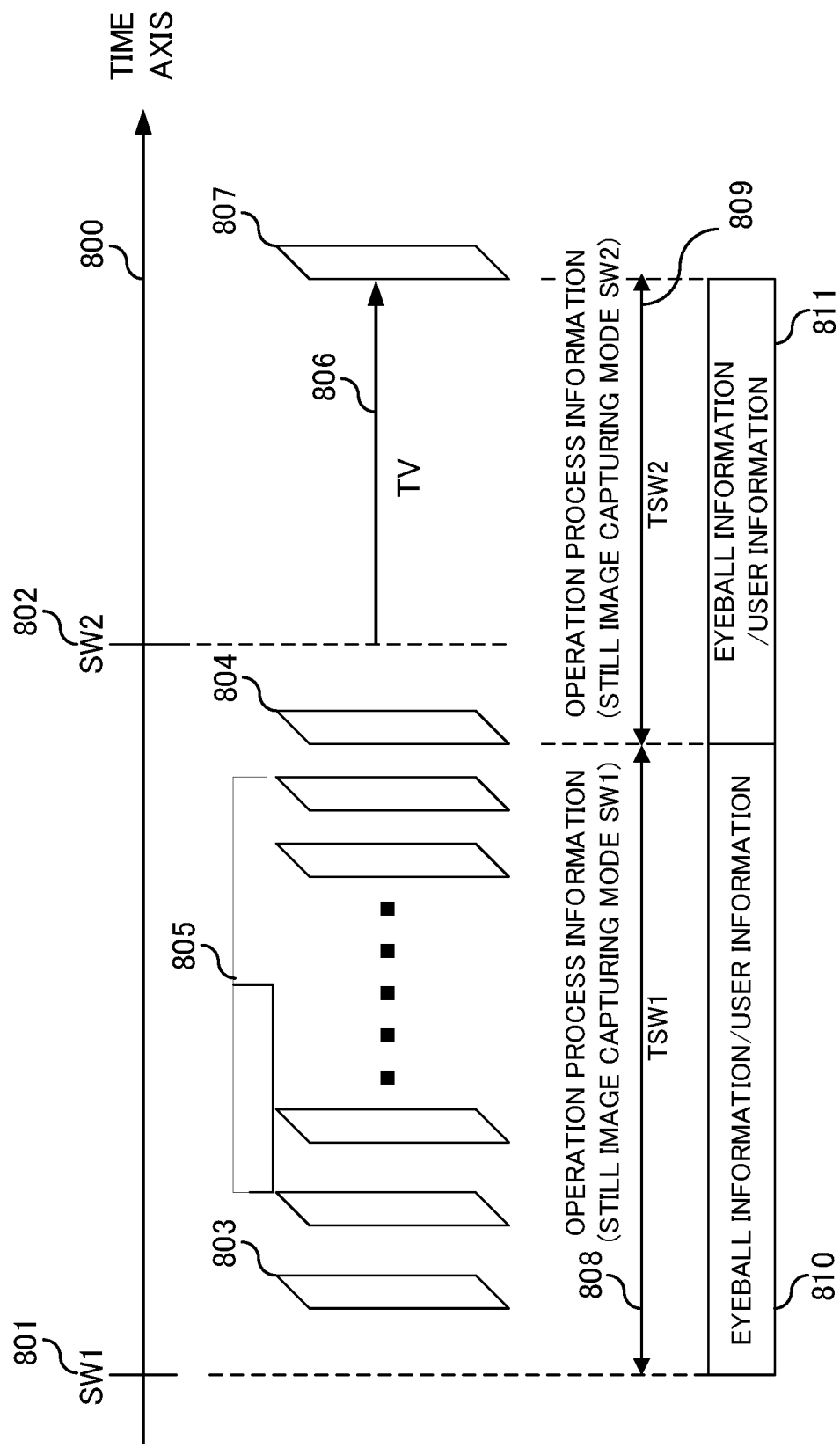
FIG. 8 is an explanatory diagram on information associated with a captured still image according to Example 3.

FIG. 8 is a diagram for explaining the relationship between the user state related to the line-of-sight and the operation process information, which are recorded in association with the still image.

An arrow 800 indicates a time axis, where time elapses more in the right direction. Time 801 indicates a timing when the first shutter switch 62 (hereafter SW1) is pressed on the time axis. When SW1 is pressed, various image capturing preparation operations, such as AF processing and AE processing, start. Time 802 indicates a timing when the second shutter switch 63 (hereafter SW2) is pressed on the time axis. When SW2 is pressed, a series of image capturing processing operations, from reading signals from the imaging unit 22 to writing the captured image in the recording medium 200 as an image file, start.

A frame 803 is the first frame acquired by the imaging unit 22 after the time 801. A frame 804 is the last frame acquired by the imaging unit 22 before the time 802. A frame group 805 indicates the frames acquired by the imaging unit 22 between the frame 803 and the frame 804, and the acquisition intervals thereof are determined depending on the frame rate of the imaging unit 22. An arrow 806 indicates an exposure time TV to the imaging unit 22 controlled by the system control unit 50. A captured image 807 is a still image which the imaging unit 22 acquires by exposure during the period of the arrow 806 from the time 802.

An arrow 808 indicates a period TSW1 from the time 801 to the acquisition of the frame 804. In this period, the system control unit 50 determines that the operation mode of the digital camera 100 is the still image capturing mode SW1 (during still image capturing preparation operation).

An arrow 809 indicates a predetermined period TSW2 which includes the time 802. In FIG. 8, the period TSW2 indicates a period from the acquisition of the frame 804 to the acquisition of the captured image 807, but is not limited thereto and may be set arbitrarily. In this period, the system control unit 50 determines that the operation mode of the digital camera 100 is the still image capturing mode SW2 (during still image capturing operation). Here the operation mode is defined as the operation process information, but is not limited thereto.

Data 810 indicates the eyeball information and the user state acquired during the period TSW1 (during image capturing preparation operation). Data 811 indicates the eyeball information and the user state acquired during the period TSW2 (during image capturing operation). The eyeball information here indicates at least one of the line-of-sight position, the line-of-sight moving the direction, the blinking, and the microsaccade information. Here the user state indicates the gaze range calculated based on the eyeball information. The eyeball information and the user state, however, are not limited thereto.

Figure 9:
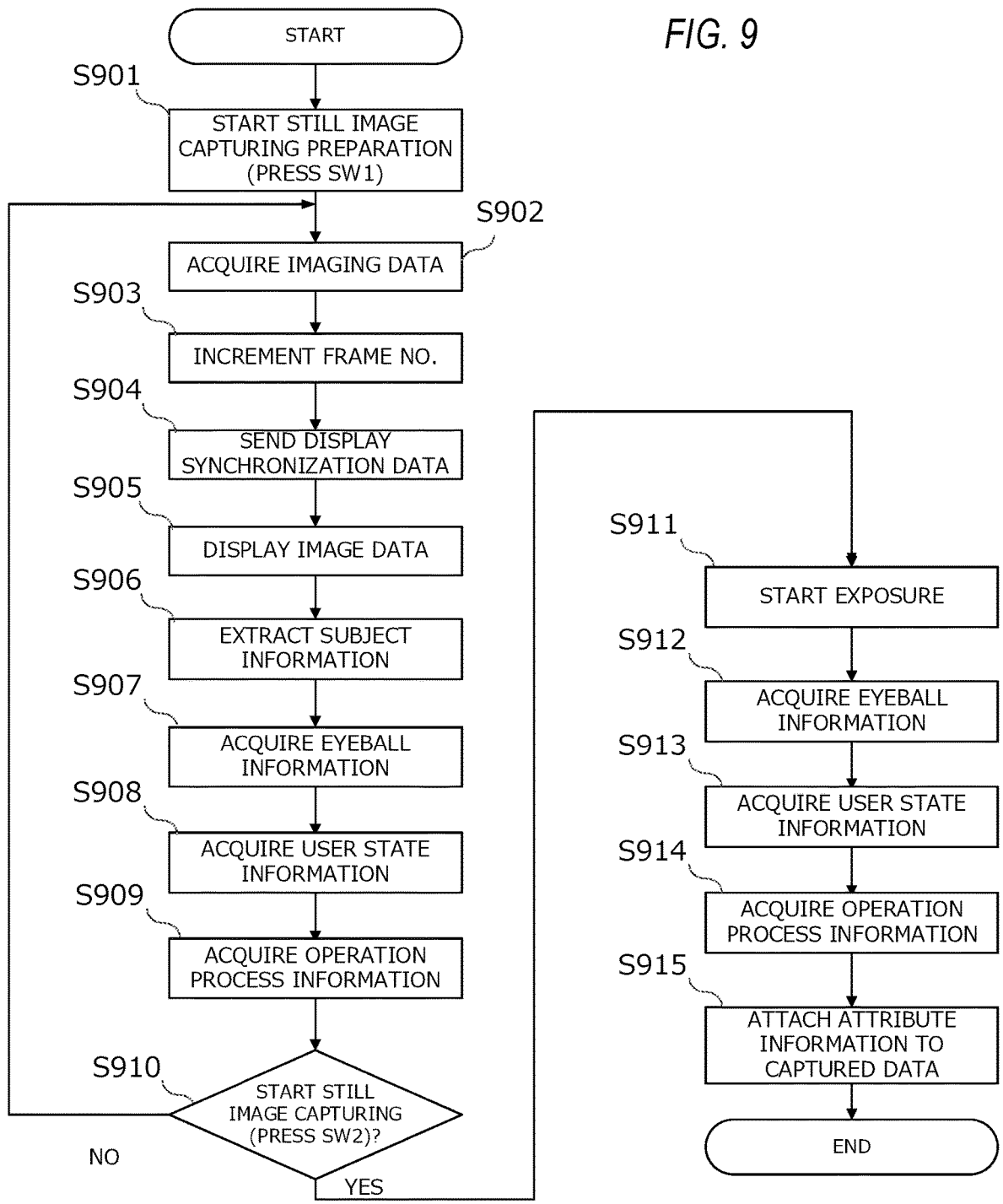
FIG. 9 is a flow chart explaining Example 3.

FIG. 9 is a flow chart for recording the still image captured by the digital camera 100 in association with the user state on the line-of-sight and the operation process information. This flow starts when the eyepiece unit 16 detects the approach of the eyeball (eye) 160 of the user.

In step S901, the user starts the still image capturing preparation operation. Here it is assumed that the timing when SW1 is pressed is the start of the still image capturing preparation operation. At this timing, the system control unit 50 shifts the operation mode of the digital camera 100 to the still image capturing mode SW1 state. In the still image capturing mode SW1, the images captured by the imaging unit 22 are displayed on the EVF 29 at a predetermined frame interval, just like the case of capturing the moving image.

Steps S902 to S905 are the same as steps S302 to S305 in FIG. 3 respectively, hence description thereof is omitted.

In step S906, the system control unit 50 analyzes the image data using the subject identification unit 170, and extracts such subject information as the subject type, the size and the position. The system control unit 50 stores the subject information in the memory 32 in association with the time at which the information was acquired.

In step S907, the system control unit 50 computes the event data acquired from the event sensor 163 using the event data arithmetic unit 164, and acquires such eyeball information as the line-of-sight position information, the saccade information, the microsaccade information and the blinking information. The system control unit 50 stores the acquired eyeball information in the memory 32, in association with the time at which each information was acquired.

In step S908, the system control unit 50 inputs the subject information and the eyeball information to the user state determination unit 165, and acquires various user state information as an output result. Here the system control unit 50 stores the acquired user state information in the memory 32, in association with the time at which the information was acquired.

In step S909, as the operation process information of the user, the system control unit 50 acquires the image capturing mode and the state of the digital camera 100 acquired from the orientation detection unit 55. The image capturing mode here is the still image capturing mode SW1. Examples of the state of the digital camera 100 are: the tripod image capturing state; the hand-held image capturing state; the walking image capturing state; the running image capturing state; and the panning image capturing state, and the system control unit 50 can discern these states based on the outputs of the gyro sensor and the acceleration sensor included in the orientation detection unit 55. The system control unit 50 records the acquired operation process information in the memory 32, in association with the time at which each information was acquired.

In step S910, it is determined if SW2 was pressed. Processing advances to step S911 if pressed, or to step S902 if not.

In step S911, the exposure to the imaging unit 22 is started based on the control by the system control unit 50. At this time, the operation mode of the digital camera 100 enters the still image capturing mode SW2 by the system control unit 50. Here the system control unit 50 recognizes the operation mode of the digital camera 100 after the time when the frame 804 was acquired, immediately before pressing SW2, as the still image capturing mode SW2.

Steps S912 and S913 are the same as steps S907 and S908 respectively, hence description thereof is omitted.

In step S914, as the operation process information of the user, the system control unit 50 acquires the image capturing mode and the state of the digital camera 100 acquired from the orientation detection unit 55. The image capturing mode here is the still image capturing mode SW2. Examples of the state of the digital camera 100 are: the tripod image capturing state; the hand-held image capturing state; the walking image capturing state; the running image capturing state; and the panning image capturing state, and the system control unit 50 can discern these states based on the output of the gyro sensor and the acceleration sensor included in the orientation detection unit 55. The system control unit 50 records the acquired operation process information in the memory 32, in association with the time at which each information was acquired.

In step S915, in addition to various information acquired in steps S906 to S909, various information acquired in steps S912 to S914 are recorded as attribute information attached to the captured still image data.

The above description on FIG. 8 and FIG. 9 is an example, and in Example 3, the eyeball information, the user state information and the operation process information, which are acquired during the image capturing preparation operation and the image capturing operation respectively, are stored as attribute information of the captured still image data. By recording the user state related to the line-of-sight and the operation process information in a time series in association with each other, the image capturing intension of the user can be recorded more closely even in the still image capturing, in addition to the effect of Example 2. In the case where the user is an expert, these recorded information can assist beginners to understand the expert's image capturing intensions closely, and improve their skill.

Other Embodiments

Embodiments of the present disclosure have been described, but the present disclosure is not limited to these embodiments, and may be modified or changed in various ways within the scope of the spirit thereof.

In the above examples, image capturing was described as an example of an operation performed by the user, but the operation content is not limited to image capturing, and may be an arbitrary operation. Examples of the operations other than the image capturing are: manufacturing or processing an article; inspection of an article; operation of an apparatus (e.g. driving a vehicle); and physical exercise.

The event sensor detects an eyeball as a detection target, and acquires eyeball information as the event information, but the target thereof if not limited to an eyeball.

The present disclosure can also be implemented by supplying a program to implement at least one function of the above mentioned embodiments to a system or an apparatus via a network or a storage medium, and by at least one processor of a computer of the system or the apparatus reading and executing the program. The present disclosure can also be implemented by a circuit (e.g. ASIC) that implements at least one of the functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, the operation process information and the eyeball information of the user or the user state information are recorded in a time series in association with each other, whereby how the user is moving the line-of-sight during an operation can be recognized and analyzed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201772, filed on Dec. 13, 2021, which is hereby incorporated by reference herein in its entirety.

What is claimed is:

1. An electronic apparatus comprising at least one memory and at least one processor which function as a plurality of units comprising:
   an eyeball information acquisition unit configured to acquire eyeball information of a user;
   an estimation unit configured to estimate a user state based on the eyeball information;
   an operation process information acquisition unit configured to acquire operation process information that allows to identify operation content of the user;
   a storage unit configured to record, in a time series, at least one of the eyeball information and the user state in association with the operation process information; and
   a movement information acquisition unit configured to acquire movement information of the electronic apparatus,
   wherein the operation process information acquisition unit is further configured to determine the operation process information based on the movement information.

2. The electronic apparatus according to claim 1, wherein said at least one memory and said at least one processor further function as an image acquisition unit configured to acquire image data that includes a field-of-view of the user, and
   wherein the storage unit is further configured to record at least one of the eyeball information and the user state in association with the operation process information, as attribute information attached to the image data.

3. The electronic apparatus according to claim 1, wherein the eyeball information includes at least one of:
   line-of-sight position information regarding a line-of-sight position of the user;
   saccade information regarding a direction or speed of a saccade;
   microsaccade information regarding occurrence frequency or amplitude of a microsaccade;
   pupil information regarding a size of a pupil or a change amount thereof; and
   blinking information regarding a speed or a number of times of blinking.

4. The electronic apparatus according to claim 1, wherein the user state is a gaze range in a field-of-view of the user.

5. The electronic apparatus according to claim 1, wherein said at least one memory and said at least one processor further function as an operation mode setting unit configured to allow to set an operation mode of the electronic apparatus, and
   wherein the operation process information acquisition unit is further configured to determine the operation process information based on the operation mode being set.

6. The electronic apparatus according to claim 5, wherein said at least one memory and said at least one processor further function as an image capturing unit configured to capture an image that includes a field-of-view of the user, and
   wherein the operation mode includes a moving image capturing mode, a still image capturing preparation mode, and a still image capturing mode.

7. The electronic apparatus according to claim 1, wherein, as the operation process information, the operation process information acquisition unit is configured to acquire any one of a tripod image capturing state, a hand-held image capturing state, a walking image capturing state, a running image capturing state, and a panning image capturing state from the movement information.

8. The electronic apparatus according to claim 1, wherein said at least one memory and said at least one processor further function as a capturing unit configured to capture a still image that includes a field-of-view of the user, and
   wherein the storage unit is further configured to record the eyeball information, the user state, and the operation process information acquired during image capturing preparation operation and during image capturing operation, as attribute information attached to the captured still image data.

9. An image capturing apparatus comprising:
   the electronic apparatus according to claim 1; and
   an image capturing unit.

10. A method for controlling an electronic apparatus, the method comprising:
    an eyeball information acquisition step of acquiring eyeball information of a user;
    an estimation step of estimating a user state based on the eyeball information;
    an operation process information acquisition step of acquiring operation process information that allows to identify operation content of the user;
    a storage step of recording, in a time series, at least one of the eyeball information and the user state in association with the operation process information; and
    a movement information acquisition step of acquiring movement information of the electronic apparatus,
    wherein the operation process information acquisition step determines the operation process information based on the movement information.

11. A non-transitory computer-readable storage medium storing a program that causes a computer to execute a method comprising:
    an eyeball information acquisition step of acquiring eyeball information of a user;
    an estimation step of estimating a user state based on the eyeball information;
    an operation process information acquisition step of acquiring operation process information that allows to identify operation content of the user;
    a storage step of recording, in a time series, at least one of the eyeball information and the user state in association with the operation process; and
    a movement information acquisition step of acquiring movement information of the electronic apparatus,
    wherein the operation process information acquisition step determines the operation process information based on the movement information.

12. The method according to claim 10, wherein the eyeball information includes at least one of:
    line-of-sight position information regarding a line-of-sight position of the user;

saccade information regarding a direction or speed of a saccade;

microsaccade information regarding occurrence frequency or amplitude of a microsaccade;

pupil information regarding a size of a pupil or a change amount thereof; and blinking information regarding a speed or a number of times of blinking.

13. The method according to claim 10, wherein the user state is a gaze range in a field-of-view of the user.

14. The method according to claim 10, wherein, as the operation process information, the operation process information acquisition unit is configured to acquire any one of a tripod image capturing state, a hand-held image capturing state, a walking image capturing state, a running image capturing state, and a panning image capturing state from the movement information.

15. The storage medium according to claim 11, wherein the eyeball information includes at least one of:

line-of-sight position information regarding a line-of-sight position of the user;

saccade information regarding a direction or speed of a saccade;

microsaccade information regarding occurrence frequency or amplitude of a microsaccade;

pupil information regarding a size of a pupil or a change amount thereof; and blinking information regarding a speed or a number of times of blinking.

16. The storage medium according to claim 11, wherein the user state is a gaze range in a field-of-view of the user.

17. The storage medium according to claim 11, wherein, as the operation process information, the operation process information acquisition unit is configured to acquire any one of a tripod image capturing state, a hand-held image capturing state, a walking image capturing state, a running image capturing state, and a panning image capturing state from the movement information.

* * * * *